US012750727B2

(12) United States Patent
Zhang et al.

(10) Patent No.: US 12,750,727 B2
(45) Date of Patent: Sep. 29, 2026

(54) METHODS AND APPARATUS FOR DATA VOLUME COUNTING

(71) Applicant: Telefonaktiebolaget LM Ericsson (publ), Stockholm (SE)

(72) Inventors: Zhang Zhang, Beijing (CN); Antonino Orsino, Kirkkonummi (FI); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 633 days.

(21) Appl. No.: 18/019,272

(22) PCT Filed: Aug. 5, 2021

(86) PCT No.: PCT/CN2021/110899
§ 371 (c)(1),
(2) Date: Feb. 2, 2023

(87) PCT Pub. No.: WO2022/028536
PCT Pub. Date: Feb. 10, 2022

(65) Prior Publication Data

US 2023/0328582 A1 Oct. 12, 2023

(30) Foreign Application Priority Data

Aug. 6, 2020 (WO) ................ PCT/CN2020/107505
Aug. 6, 2020 (WO) ................ PCT/CN2020/107584

(51) Int. Cl.
*H04W 28/02* (2009.01)
*H04W 24/08* (2009.01)

(52) U.S. Cl.
CPC ....... *H04W 28/0289* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2018/0152986 | A1* | 5/2018 | Jung ..................... | H04W 76/27 |
| 2020/0029353 | A1 | 1/2020 | Xu et al. | |
| 2020/0236581 | A1 | 7/2020 | Zhang et al. | |
| 2020/0344708 | A1* | 10/2020 | Liao ..................... | H04W 72/02 |
| 2021/0153063 | A1* | 5/2021 | Zhang ................... | H04W 88/04 |
| 2022/0377829 | A1* | 11/2022 | Kim ...................... | H04W 76/11 |
| 2023/0022611 | A1* | 1/2023 | Fujishiro ............. | H04W 36/033 |

(Continued)

OTHER PUBLICATIONS

International Search Report and Written Opinion issued in International Application No. PCT/CN2021/110899 dated Nov. 5, 2021 (16 pages).

(Continued)

*Primary Examiner* — Peter P Chau
(74) *Attorney, Agent, or Firm* — Rothwell, Figg, Ernst & Manbeck, P.C.

(57) ABSTRACT

Methods and apparatus supportive to D2D communications are disclosed. A method performed by a relay user equipment, relay UE, comprises: monitoring a data traffic volume at the relay UE; and determining a size of a first portion of the data traffic volume related to the relay UE, and a size of a second portion of the data traffic volume related to a remote UE that is connected to the relay UE.

9 Claims, 20 Drawing Sheets

(56) References Cited

U.S. PATENT DOCUMENTS

| | | | | |
|---|---|---|---|---|
| 2023/0023135 A1* | 1/2023 | Liu | ......................... | H04W 4/00 |
| 2023/0146227 A1* | 5/2023 | Lee | ......................... | H04W 72/25 370/329 |

OTHER PUBLICATIONS

3GPP TS 38.323 V16.1.0 (Jul. 2020), 3rd Generation Partnership Project; Technical Specification Group Radio Access Network; NR; Packet Data Convergence Protocol (PDCP) specification (Release 16), Jul. 2020 (40 pages).

Ericsson, "UP aspects for Layer 2 SL relay", 3GPP TSG-RAN WG2 #113bis-e, R2-2103002, Electronic meeting, Apr. 12, 2021-Apr. 20, 2021 (3 pages).

3GPP TS 37.340 V.16.2.0 (Jul. 20, 2020), 3rd Generation Partnership Project; Technical Specification Group Radio Access Network; Evolved Universal Terrestrial Radio Access (E-UTRA) and NR; Multi-connectivity; Stage 2 (Release 16), Jul. 2020 (78 pages).

OPPO, "New SID: Study on NR sidelink relay", 3GPP TSG RAN Meetig #86, RP-193253, Sitges, Spain, Dec. 9-12, 2019 (5 pages).

3GPP TS 38.322 V16.0.0 (Mar. 2020), 3rd Generation Partnership Project; Technical Specification Group Radio Access Network; NR; Radio Link Control (RLC) protocol specification (Release 16), Mar. 2020 (33 pages).

3GPP TS 38.321 V16.0.0 (Mar. 2020), 3rd Generation Partnership Project; Technical Specification Group Radio Access Network; NR; Medium Access Control (MAC) protocol specification (Release 16), Mar. 2020 (141 pages).

3GPP TS 38.323 V16.0.0 (Mar. 2020), 3rd Generation Partnership Project; Technical Specification Group Radio Access Network; NR; Packet Data Convergence Protocol (PDCP) specification (Release 16), Mar. 2020 (37 pages).

* cited by examiner

METHODS AND APPARATUS FOR DATA VOLUME COUNTING

CROSS REFERENCE TO RELATED APPLICATIONS

This application is a 35 U.S.C. § 371 National Stage of International Patent Application No. PCT/CN2021/110899, filed 2021 Aug. 5, which claims priority to: 1) International Patent Application No. PCT/CN2020/107505, filed 2020 Aug. 6 and 2) International Patent Application No. PCT/CN2020/107584, filed 2020 Aug. 6. The above identified applications are incorporated by this reference.

FIELD OF THE INVENTION

The present disclosure generally relates to wireless communication, and more specifically, to methods performed by a relay UE for data volume counting and apparatus thereof.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

3GPP Work on Sidelink

The 3$^{rd}$ Generation Partnership Project (3GPP) specified the Long Term Evolution (LTE) device-to-device (D2D) technology, also known as ProSe (Proximity Services) in the Release 12 and 13 of LTE. Later in Rel. 14 and 15, LTE Vehicle to everything (V2X) related enhancements targeting the specific characteristics of vehicular communications were specified. 3GPP work has begun, within the scope of Rel. 16, on developing a new radio (NR) version of V2X communications. The NR V2X mainly targets advanced V2X services, which can be categorized into four use case groups: vehicles platooning, extended sensors, advanced driving and remote driving. The advanced V2X services would require enhanced NR system and new NR sidelink (D2D) framework to meet the stringent requirements in terms of latency and reliability. NR V2X system also expects to have higher system capacity and better coverage and to allow for an easy extension to support the future development of further advanced V2X services and other services.

Given the targeted services by NR V2X, it is commonly recognized that groupcast/multicast and unicast transmissions are desired, in which the intended receiver of a message consists of only a subset of the vehicles in proximity to the transmitter (groupcast) or of a single vehicle (unicast). For example, in the platooning service there are certain messages that are only of interest of the members of the platoon, making the members of the platoon a natural groupcast. In another example, the see-through use case most likely involves only a pair of vehicles, for which unicast transmissions naturally fit. Therefore, NR sidelink can support broadcast (as in LTE), groupcast and unicast transmissions. Furthermore, NR sidelink is designed in such a way that its operation is possible with and without network coverage and with varying degrees of interaction between the UEs (user equipment) and the NW (network), including support for standalone, network-less operation.

In future 3GPP updates (including Rel. 17), National Security and Public Safety (NSPS) may be considered, in addition to V2X, an important use case that can benefit from the already developed NR sidelink features in Re1.16. Therefore, it is likely that future 3GPP systems will specify enhancements related to the NSPS use case taking NR Rel. 16 sidelink as a baseline.

In some scenarios NSPS services need to operate with partial or w/o NW coverage, such as indoor firefighting, forest firefighting, earthquake rescue, sea rescue, etc. where the infrastructure may be (partially) destroyed or not available. Therefore, coverage extension is a crucial enabler for NSPS, for both NSPS services communicated between UE and cellular NW and that communicated between UEs over sidelink, as well as for other use cases.

"Study on NR Sidelink Relay" by 3GPP, a study item identified as RP-193253 and available at https://www.3gpp.org/ftp/Meetings_3GPP_SYNC/RAN/Inbox/ as of 5 Aug. 2020, aims to further explore coverage extension for sidelink-based communication, including both UE to NW relay for cellular coverage extension and UE to UE relay for sidelink coverage extension.

Layer 2 (L2) UE-to-Network Relay

The L2 UE to NW Relay UE (that is, a relay UE, a UE with relay functionality) provides the functionality to support connectivity to 5$^{th}$ Generation (5G) networks for Remote UEs. The protocol stack for L2 UE to NW relay UE is shown in FIG. 1 and FIG. 2 for the user plane and control plane respectively. It is important to note that the two endpoints of the Packet Data Convergence Protocol (PDCP) link are the Remote UE and the 5$^{th}$ generation base station (gNB), which means the remote UE has its own context in the Radio Access Network (RAN) and core NW. i.e. the remote UE has its own radio bearer, Radio Resource Control (RRC) connection and Protocol Data Unit (PDU) session. The relay function is performed below PDCP, for example, in the adaptation layer. The remote UE's traffic (both control plane and user plane) is transparently transferred between the remote UE and gNB over the L2 UE to NW Relay UE without any modifications.

The adaptation layer between the L2 UE to NW Relay UE and the gNB is able to differentiate between Uu bearers (which may be radio bearers of an interface between a relay node and UE) of a particular remote UE. Different Remote UEs and different Uu bearers of the Remote UE are indicated by additional information (e.g. UE IDs and bearer IDs) included in adaptation layer header which is added to PDCP PDU. Different Remote UEs can share the same Uu bearer; and a Uu bearer can bear both a remote UE's and a relay UE's services. The adaptation layer can be considered as part of PDCP sublayer or a separate new layer between PDCP sublayer and RLC sublayer.

When both the remote UE and the L2 UE to NW Relay UE are in RRC idle/inactive mode and there is incoming DL traffic for the remote UE, the NW will first page the remote UE, the L2 UE to NW relay UE monitors the paging and informs the remote UE that there is DL traffic for the remote UE, then both the remote UE and the L2 UE to NW Relay UE establish/resume the RRC connection to the gNB and the remote UE traffic is transparently transferred between the remote UE and gNB over the L2 UE to NW Relay UE.

Layer 3 (L3) UE-to-Network Relay

The L3 UE to NW relay UE may relay unicast traffic (UL and DL) between the Remote UE and the network. It may provide generic functionality that can relay any IP, Ethernet or Unstructured traffic. The protocol stack for L3 UE to NW relay UE is shown in FIG. 3, where relaying is performed in PDU layer. The Remote UE is invisible to core NW, i.e. it does not have its own context and PDU session in the core NW, its traffic is forwarded in relay UE's PDU session. For IP PDU Session Type and IP traffic over PC5 reference point, the L3 UE to NW relay UE allocates an Internet Protocol Version 6 (IPv6) prefix or an Internet Protocol Version 4 (IPv4) address for the remote UE.

Where the L3 UE to NW relay UE is in RRC idle/inactive mode and there is incoming DL traffic for the remote UE, the NW will first page the L3 UE to NW relay UE, which triggers the L3 UE to NW relay UE to establish/resume the RRC connection, and then the NW sends the remote UE's traffic to the L3 UE to NW relay UE which further forwards it to the remote UE.

Multi-Radio Dual Connectivity

Next Generation Radio Access Networking (NG-RAN) supports Multi-Radio Dual Connectivity (MR-DC) operation whereby a UE in an RRC_CONNECTED state is configured to utilise radio resources provided by two distinct schedulers, which may be located in two different NG-RAN nodes connected via a (non-ideal) backhaul connection. One of the NG-RAN nodes may provide NR access and the other may provide either Evolved-Universal Terrestrial Radio Access (E-UTRA) or NR access. Further details of MR-DC operation can be found in "Evolved Universal Terrestrial Radio Access (E-UTRA) and NR; Multi-connectivity; Stage 2" by 3GPP, TS 37.340 V 16.2.0, available at https://portal.3gpp.org/desktopmodules/Specifications/SpecificationDetails aspx?specificationId=3 198 as of 5 Aug. 2020.

In MR-DC, there is typically a split bearer whose radio protocols are located in both the Master gNB (MgNB) and the Secondary gNB (SgNB) to use both MgNB and SgNB resources. For split bearers, each PDCP entity is associated with two UM RLC entities (for same direction), four UM RLC entities (two for each direction), or two AM RLC entities (for same direction). The RLC entity other than the primary RLC entity which is responsible for split bearer operation is called a split secondary RLC entity. If the PDCP entity is associated with two RLC entities, the split secondary RLC entity is the RLC entity other than the primary RLC entity. If the PDCP entity is associated with more than two RLC entities, the split secondary RLC entity is configured by upper layers. A typical split bearer configuration is shown in FIG. 4.

Data Volume Calculation

As described in clause 5.6 in 3GPP TS 38.323 V16.0.0 (which is incorporated herein at its entirety by reference), for the purpose of MAC buffer status reporting, the transmitting PDCP entity may consider the following when determining PDCP data volume:

- The PDCP SDUs for which no PDCP Data PDUs have been constructed;
- The PDCP Data PDUs that have not been submitted to lower layers;
- The PDCP Control PDUs;
- For AM DRBs (Data Radio Bearers using Acknowledged Mode Radio Link Control, RLC), the PDCP SDUs to be retransmitted after e.g. PDCP entity re-establishment;
- For AM DRBs, the PDCP Data PDUs to be retransmitted during e.g. PDCP data recovery.

For the purpose of MAC buffer status reporting, the UE shall consider the following as RLC data volume:

- RLC SDUs and RLC SDU segments that have not yet been included in an RLC data PDU;
- RLC data PDUs that are pending for initial transmission;
- RLC data PDUs that are pending for retransmission (RLC AM).

In addition, if a STATUS PDU has been triggered and t-StatusProhibit is not running or has expired, the UE shall estimate the size of the STATUS PDU that will be transmitted in the next transmission opportunity, and consider this as part of RLC data volume.

If the transmitting PDCP entity is associated with at least two RLC entities, when indicating the PDCP data volume to a MAC entity for Buffer Status Report (BSR) triggering and Buffer Size calculation (as specified in "NR; Medium Access Control (MAC) protocol specification" by 3GPP, TS 38.321 v 16.1.0 and "Evolved Universal Terrestrial Radio Access (E-UTRA); Medium Access Control (MAC) protocol specification" by 3GPP, TS 36.321 v 16.1.0, both available at https://portal.3gpp.org/#/ as of 5 Aug. 2020), the transmitting PDCP entity shall:

- If the PDCP duplication is activated for the radio bearer (RB):
  - Indicate the PDCP data volume to the MAC entity associated with the primary RLC entity;
  - Indicate the PDCP data volume excluding the PDCP Control PDU to the MAC entity associated with the RLC entity other than the primary RLC entity activated for PDCP duplication;
  - Indicate the PDCP data volume as 0 to the MAC entity associated with RLC entity deactivated for PDCP duplication;
- else (i.e., the PDCP duplication is deactivated for the RB):
  - if the split secondary RLC entity is configured; and
  - if the total amount of PDCP data volume and RLC data volume pending for initial transmission (as specified in "NR; Radio Link Control (RLC) protocol specification" by 3GPP, TS 38.322 v 16.1.0, available at https://portal.3gpp.org/#/ as of 5 Aug. 2020) in the primary RLC entity and the split secondary RLC entity is equal to or larger than a data threshold ul-DataSplitThreshold.
- indicate the PDCP data volume to both the MAC entity associated with the primary RLC entity and the MAC entity associated with the split secondary RLC entity.
- indicate the PDCP data volume as 0 to the MAC entity associated with RLC entity other than the primary RLC entity and the split secondary RLC entity;
- submit the PDCP PDU to either the primary RLC entity or the split secondary RLC entity.
- else:
- Indicate the PDCP data volume to the MAC entity associated with the primary RLC entity;
- Indicate the PDCP data volume as 0 to the MAC entity associated with the RLC entity other than the primary RLC entity.

For UL split bearer configurations, the data threshold parameter ul-DataSplitThreshold is introduced for configuring the uplink split. It is a byte-based parameter on PDCP level configured by RRC. If the total amount of PDCP data volume and RLC data volume pending for initial transmission in the primary RLC entity and the split secondary RLC entity is equal to or larger than ul-DataSplitThreshold, the UE may submit the PDCP PDU to either the primary RLC entity or the split secondary RLC entity. Otherwise, where the total amount of PDCP data volume and RLC data volume pending is less than ul-DataSplitThreshold the data is only routed to the MCG. The above two scenarios are illustrated in FIG. 5. By contrast, in LTE, the UE may route the data to either MCG or SCG indicated by the RRC parameter ul-DataSplitDRB-ViaSCG.

There currently exist certain challenge(s). In the L2 UE to NW relay architecture, the UE protocol stack extends only as far as the adaptation layer. Therefore, there is no visibility for the remote UE's PDCP PDU and thus the Uu data volume from the remote UE(s) cannot be directly counted. Also, some of the remote UE's Uu traffic may be in the remote UE's Tx buffer while some is received by the relay UE but not sent to the NW yet; it may not be possible to count the remote UE's Uu data volume in such situation which may lead to decreased system performance especially when a split bearer configuration is used.

In upcoming 3GPP Rel-17 SI on NR sidelink relay (RP-193253 "New SID: Study on NR sidelink relay", which is incorporated herein at its entirety by reference), it is desired to obtain mechanism(s) with minimum specification impact to support the SA requirements for sidelink-based UE-to-NW and UE-to-UE relay, focusing on the following aspects (if applicable) for L3 relay and L2 relay.

SUMMARY

According to a first aspect of the present disclosure, a method performed by a relay user equipment, relay UE, supporting device-to-device, D2D, communications is provided, wherein the relay UE is capable of providing a connection to a communication network for a remote UE. The method includes: monitoring a data traffic volume at the relay UE; and determining a size of a first portion of the data traffic volume, and a size of a second portion of the data traffic volume, wherein the first portion of the data traffic volume relates to the relay UE, comprising Packet Data Convergence Protocol, PDCP, Protocol Data Units, PDU of the relay UE, and/or Radio Link Control, RLC data of the relay UE, and the second portion of the data traffic volume relates to the remote UE that is connected to the relay UE, comprising PDCP PDU and/or RLC data of the remote UE.

In an exemplary embodiment, the relay UE is configured with a primary Radio Link Control, RLC, entity and a split secondary RLC entity.

In an exemplary embodiment, the method further includes the step of comparing at least one of the size of the first portion and the size of the second portion to a data threshold.

In an exemplary embodiment, the step of comparing comprises one of: combining the first portion and second portion and comparing the size of the result to the data threshold; comparing the size of the first portion to the data threshold and separately comparing the size of the second portion to the data threshold; and comparing the size of the first portion to a first data threshold, and comparing the size of the second portion to a second data threshold, the first data threshold being different to the second data threshold.

In an exemplary embodiment, the method further includes the step of indicating, to the remote UE, the determined size of the second portion.

In an exemplary embodiment, the relay UE indicates the determined size of the second portion to the remote UE using one or more of: one or multiple PC5-RRC signaling messages; one or multiple control PDUs in PC5-RLC; one or multiple sidelink MAC CEs; and/or one or multiple control PDUs in an adaptation layer.

In an exemplary embodiment, an indication of the determined size of the second portion is sent to the remote UE periodically, wherein the indication of the determined size of the second portion is sent to the remote UE when triggered by a triggering event, and/or wherein the indication of the determined size of the second portion is sent to the remote UE in response to a request from the remote UE.

In an exemplary embodiment, the request from the remote UE includes a data volume status report from the remote UE.

In an exemplary embodiment, the relay UE determines the size of the second portion based on an estimate of the size of the second portion sent by the remote UE to the relay UE.

In an exemplary embodiment, the relay UE determines the size of the first portion and/or the size of the second portion using an indication in an adaption layer of absolute or relative PDCP PDU size of each PDCP PDU carried in the same RLC SDU.

In an exemplary embodiment, the method further includes the step of determining to send the first portion and/or the second portion using at least one of the primary RLC entity and split secondary RLC entity based on the results of the step of comparing.

In an exemplary embodiment, the method further includes: providing user data; and forwarding the user data to a host computer via transmission to a base station.

In an exemplary embodiment, the relay UE is configured with at least one first RLC entity respectively for at least one split radio bearer, and the method further includes: receiving split data for at least one first RLC entity from the remote UE; and forwarding the split data to at least one network node respectively.

In an exemplary embodiment, one first RLC entity is configured in the relay UE, and the remote UE is connected to one of more than one network node via the relay UE which is one of a plurality of the relay UEs, and the receiving further includes receiving, from the remote UE, the split data for the first RLC entity, and the forwarding further includes forwarding the split data for the first RLC entity to the corresponding network node over one connection between the first RLC entity and a peer RLC entity configured in the corresponding network node.

In an exemplary embodiment, more than one first RLC entity is configured in the relay UE, and the remote UE is connected to more than one network node via the relay UE, and the receiving further includes receiving, from the remote UE, the split data respectively for the more than one first RLC entity, and the forwarding further includes forwarding, to the more than one network node respectively, the split data respectively for the more than one first RLC entity over corresponding connections, wherein each of the connections is between one of the more than one first RLC entity and a peer RLC entity configured in the corresponding one of the more than one network node.

In an exemplary embodiment, at least one second RLC entity is configured in a further relay UE, and the remote UE is connected to more than one network node via the relay UE and the further relay UE, and the receiving further includes: the relay UE receiving, from the remote UE, the split data for the first RLC entity, and the further relay UE receiving, from the remote UE, the split data for the second RLC entity, and the forwarding further includes: the relay UE forwarding the split data to a corresponding network node over a connection between the first RLC entity and a peer RLC entity configured in the corresponding network node; and the further relay UE forwarding the split data to a corresponding network node over a connection between the second RLC entity and a peer RLC entity configured in a corresponding network node.

In an exemplary embodiment, there are split data over at least one direct connection between the remote UE and the more than one network node.

In an exemplary embodiment, the more than one network node is comprised in a same cell group or different cell groups.

In an exemplary embodiment, the cell group is at least one of: a master cell group or a secondary cell group.

In an exemplary embodiment, the method further includes: receiving, from the remote UE, a request message for relay discovery; and responding the remote UE with a reply message that comprises at least one of: radio quality measurement related information on a sidelink connection between the relay UE and the remote UE, radio quality measurement related information on a cellular link connection between the relay UE and the network node, a UE ID of the relay UE.

According to a second aspect of the present disclosure, a method performed by a UE supporting D2D communications is provided, wherein the UE is capable of establishing a connection to a communication network via a relay UE. The method includes: determining a size of a data traffic volume related to the UE, wherein the determined size belongs to a second portion of data traffic volume being received by the relay UE connected to the UE.

In an exemplary embodiment, the method further includes sending to the relay UE a data volume status report regarding data traffic volume to be sent to the communication network via the relay UE.

In an exemplary embodiment, the relay UE is configured with a primary Radio Link Control, RLC, entity and a split secondary Radio Link Control, RLC, entity, and the method further comprises determining, by the UE, whether or not to send data to both or one of the primary and the split secondary RLC entity.

In an exemplary embodiment, the determination is based whether or not to send data to both or one of the primary and the split secondary RLC entity comprises: determining on a comparison between a combination of the determined size of the second portion and the data volume status report, and a data threshold.

In an exemplary embodiment, the determination of the size of the second portion comprises one of: sending a request to the relay UE; and receiving an indication of the size of the second portion from the relay UE; receiving an indication of the size of the second portion periodically from the relay UE; and receiving an indication of the size of the second portion from the relay UE, when a triggered event happens.

In an exemplary embodiment, the data volume status report is included in the request.

In an exemplary embodiment, the indication of the size of the second portion is sent by one or more of: one or multiple PC5-RRC signaling messages; one or multiple control PDUs in PC5-RLC; one or multiple sidelink MAC CEs; and/or one or multiple control PDUs in an adaptation layer.

In an exemplary embodiment, the determination of the size of the second portion comprising: estimating the size based on measurement of delivered data to its lower layers by PDCP layer.

In an exemplary embodiment, the method further includes: transmitting, to at least one relay UE, split data respectively for at least one split radio bearer, wherein at least one first RLC entity is configured in each of the at least one relay UE respectively for the at least one split radio bearer.

In an exemplary embodiment, one first RLC entity is configured in the relay UE, and the UE is connected to one of more than one network node via a corresponding one of more than one relay UE, and the transmitting further includes transmitting, to the more than one relay UE respectively, the split data respectively for the more than one relay UE.

In an exemplary embodiment, more than one first RLC entity is configured in the relay UE, and the UE is connected to more than one network node via the relay UE, and the transmitting further includes transmitting, to the relay UE, the split data respectively for the more than one first RLC entity.

In an exemplary embodiment, at least one second RLC entity is configured in a further relay UE, and the UE is connected to more than one network node via the relay UE and the further relay UE, and the transmitting further includes transmitting, to the relay UE, the split data for the first RLC entity, and transmitting, to the further relay UE, the split data for the second RLC entity.

In an exemplary embodiment, the method further includes transmitting, over at least one direct connection between the UE and at least one of the more than one network node, split data for the at least one network node.

In an exemplary embodiment, the method further includes: transmitting, to a set of further UEs, a request message for relay discovery; and receiving one or more reply messages respectively from one or more of the set of further UEs, wherein the reply message comprises at least one of: radio quality measurement related information on a sidelink connection between the corresponding further UE and the UE, radio quality measurement related information on a cellular link connection between the corresponding further UE and the network node, and a UE ID of the corresponding further UE.

In an exemplary embodiment, the method further includes: determining the at least one further UE among the one or more further UEs as relay UE(s) based on at least one of the sidelink connection radio quality, the cellular link connection radio quality, or a response time of the corresponding further UE.

In an exemplary embodiment, the method further includes: transmitting, to one of a set of further UEs, a request message for relay discovery; and receiving a reply message from the further UE, wherein the reply message comprises at least one of: radio quality measurement related information on a sidelink connection between the further UE and the UE, radio quality measurement related information on a cellular link connection between the further UE and the network node, and a UE ID of the further UE.

In an exemplary embodiment, the method further includes: determining the further UE among the set of further UEs as a relay UE based on at least one of the sidelink connection radio quality, the cellular link connection radio quality, or a response time of the further UE; and repeating, for each of the remaining further UEs, the steps of transmitting a request message for relay discovery, receiving a replay message, and determining as a relay UE to determine the at least one relay UE.

In an exemplary embodiment, a number of the at least one relay UE is determined by system configuration.

According to a third aspect of the present disclosure, a relay UE supporting D2D communication is provided. The relay UE includes processing circuitry configured to perform any of the steps of any method according to the first aspect of the present disclosure, and power supply circuitry configured to supply power to the relay UE.

According to a fourth aspect of the present disclosure, a relay UE supporting D2D communication is provided. The relay UE includes at least one processor, and at least one memory, storing instructions which, when executed on the at least one processor, cause the relay UE to perform any of the steps of any method according to the first aspect of the present disclosure.

According to a fifth aspect of the present disclosure, a UE supporting D2D communications is provided. The UE includes processing circuitry configured to perform any of the steps of any method according to the second aspect of the present disclosure, and power supply circuitry configured to supply power to the UE.

According to a sixth aspect of the present disclosure, a UE supporting D2D communications is provided. The UE includes at least one processor, and at least one memory, storing instructions which, when executed on the at least one processor, cause the UE to perform any of the steps of any method according to the second aspect of the present disclosure.

According to a seventh aspect of the present disclosure, a computer readable storage medium having computer program instructions stored thereon, the computer program instructions, when executed by at least one processor in a network node, causing the at least one processor to perform the methods respectively according to the first and second aspects of the present disclosure.

According to an eighth aspect of the present disclosure, a relay UE supporting D2D communication is provided. The relay UE includes: an antenna configured to send and receive wireless signals; radio front-end circuitry connected to the antenna and to processing circuitry, and configured to condition signals communicated between the antenna and the processing circuitry; the processing circuitry being configured to perform any of the steps of any method according to the first aspect of the present disclosure; an input interface connected to the processing circuitry and configured to allow input of information into the relay UE to be processed by the processing circuitry; an output interface connected to the processing circuitry and configured to output information from the relay UE that has been processed by the processing circuitry; and a battery connected to the processing circuitry and configured to supply power to the relay UE.

According to a ninth aspect of the present disclosure, a communication system is provided. The communication system includes a host computer including: processing circuitry configured to provide user data; and a communication interface configured to forward the user data to a cellular network for transmission to a relay UE according to the eighth aspect of the present disclosure. The cellular network includes a base station having a radio interface and processing circuity.

According to a tenth aspect of the present disclosure, a communication system is provided. The communication system includes a host computer including: processing circuitry configured to provide user data; and a communication interface configured to forward user data to a cellular network for transmission to a UE. The UE includes a radio interface and processing circuitry. The UE's processing circuitry is configured to perform the method according to the first or second aspect of the present disclosure.

BRIEF DESCRIPTION OF THE DRAWINGS

The objects, advantages and characteristics of the present disclosure will be more apparent, according to descriptions of preferred embodiments in connection with the drawings, in which.

DETAILED DESCRIPTION

Figure 1:
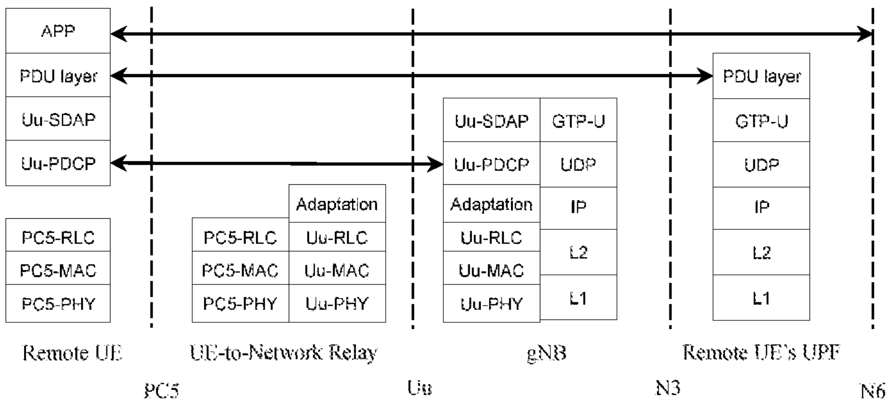
FIG. 1 shows a User Plane Stack for L2 UE-to-Network Relay UE.
Figure 2:
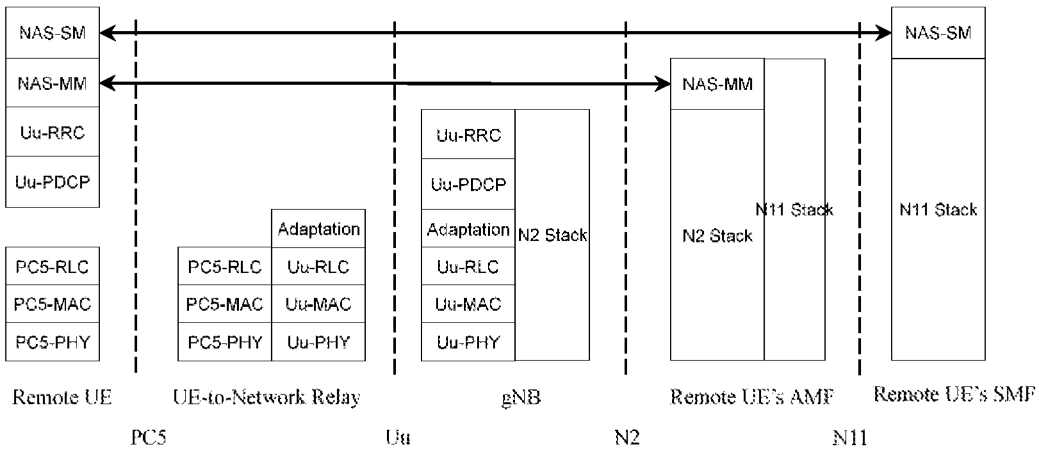
FIG. 2 shows a Control Plane for L2 UE-to-Network Relay UE.
Figure 3:
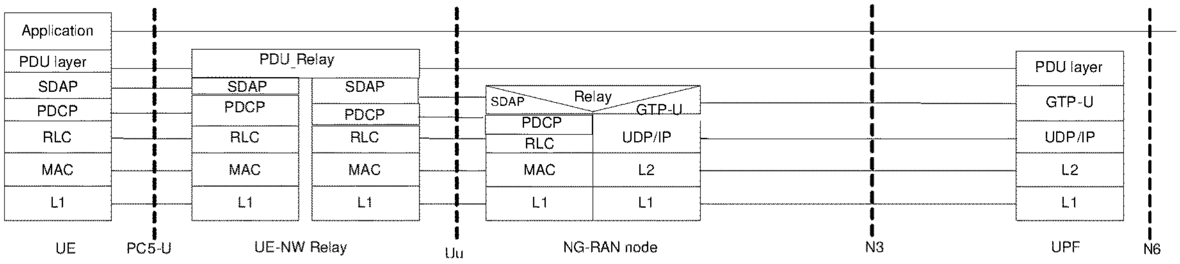
FIG. 3 shows a Protocol stack for L3 UE-to-Network Relay.
Figure 4:
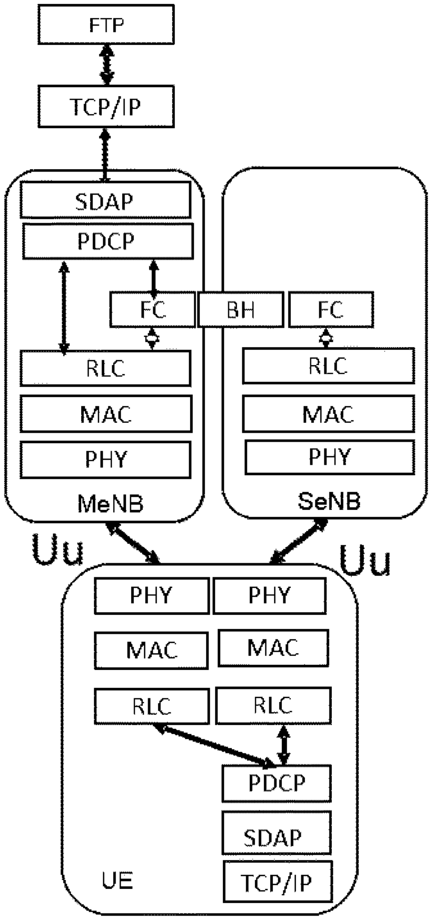
FIG. 4 shows an exemplary split bearer scenario with uplink data split.
Figure 5:
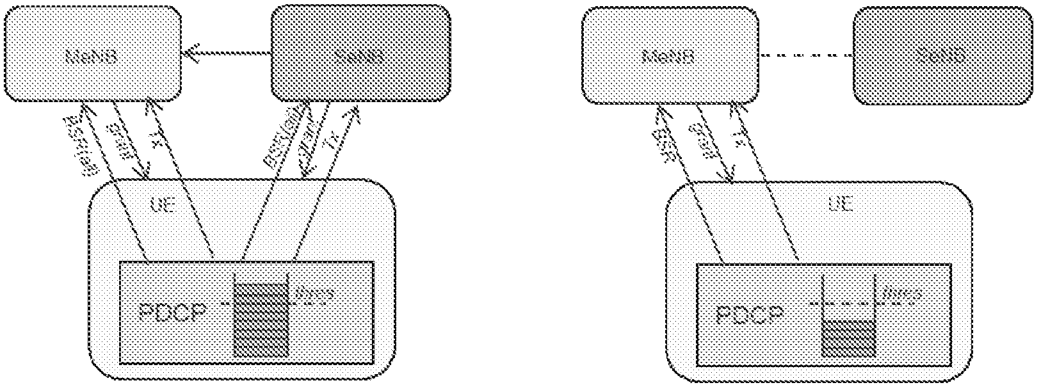
FIG. 5 shows an exemplary uplink bearer split scenario.
Figure 6:
FIG. 6 shows an exemplary UE-to-NW relay scenario.

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

The techniques described herein may be used for various wireless communication networks such as CDMA, TDMA, FDMA, OFDMA, SC-FDMA, LTE and other networks developed in the future. The terms "network" and "system" are often used interchangeably. For illustration only, certain aspects of the techniques are described below for the next, i.e., the 5th generation of wireless communication network, such as NR. However, it will be appreciated by the skilled in the art that the techniques described herein may also be used for other wireless networks such as LTE and corresponding radio technologies mentioned herein as well as wireless networks and radio technologies proposed in the future.

In the following description and claims, unless defined otherwise, all technical and scientific terms used herein have the same meaning as commonly understood by one of ordinary skills in the art to which this disclosure belongs.

Certain aspects of the present disclosure and their embodiments may provide solutions to the challenges set out above and/or other challenges. The present disclosure provides mechanisms and procedures which may enable accurate data volume counting when the UE to NW relay is used for communication with the NW. More specifically, embodiments may provide one or more of:

Means for the relay UE to count the data volume of Uu traffic of the remote UE and itself. Means for the remote UE to count the data volume of its Uu traffic pending in its Tx buffer.

Means for the relay UE to indicate to the remote UE the data volume of the remote UE's Uu traffic that the relay UE has received and is pending for transmission.

When a split secondary RLC entity is configured for the relay UE, the relay UE may determine whether the Uu data of the relay UE and/or the remote UE should/could be sent to the split secondary RLC entity based on the counted data volume.

When a split secondary RLC entity is configured at the remote UE, the remote UE may determine whether or not to submit its Uu data to the split secondary RLC based on the data volume of its Uu traffic counted by itself and optionally also that indicated by the relay UE.

There are, proposed herein, various embodiments which address one or more of the issues disclosed herein.

Certain embodiments may provide one or more of the following technical advantage(s). The mechanisms and procedures disclosed herein may allow the Uu data volume of the remote UE and the relay UE to be counted more accurately and the system performance to be improved, especially when a split bearer is configured.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Aspects of embodiments are described in the context of NR sidelink communications. However, embodiments may also be applied to any kind of radio access technology allowing a direct communication between UEs involving device-to-device (D2D) communications. The term relay UE is used to refer to, for example, UE to NW relay UE.

Embodiments are aiming to improve data volume counting for a UE configured with a split radio bearer towards the RAN. The UE may be a remote UE connecting to the RAN via a relay UE. The UE could be also a relay UE. For the split radio bearer, the data split is performed at the PDCP layer. There will be at least two RLC entities connecting to a same PDCP entity. PDCP PDUs are split among RLC entities. Some of the RLC entities may be placed in the UE itself, while some other RLC entities may be placed in other UEs, which communicates to the UE via PC5 link. In the below embodiment, there are only two RLC entities referred (named as the primary RLC entity, and secondary RLC entity or split secondary RLC entity). However, the disclosure is not limited to two RLC entities only. The embodiments are also applicable to a split radio bearer among more than two RLC entities. In addition, in the below embodiments, when a UE is configured with a split secondary RLC entity, it interchangeably means that "the UE is configured with a split radio bearer towards the RAN".

In embodiments, a method performed by a relay UE supportive of D2D communications is disclosed. The relay UE is capable of providing a connection to a communication network for a remote UE, and the method comprises:

monitoring a data traffic volume at the relay UE; and determining a size of a first portion of the data traffic volume, and a size of a second portion of the data traffic volume, wherein the first portion of the data traffic volume relates to the relay UE, comprising Packet Data Convergence Protocol, PDCP, Protocol Data Units, PDU of the relay UE, and/or Radio Link Control, RLC data of the relay UE, and the second portion of the data traffic volume relates to the remote UE that is connected to the relay UE, comprising PDCP PDU and/or RLC data of the remote UE.

In embodiments, when a split secondary RLC entity is configured for a relay UE, which means a primary RLC entity and the split secondary RLC entity are both located in the relay UE, the relay UE may determine separately for each of the remote UE and relay UE whether or not to submit their respective PDCP PDU to the split secondary RLC entity of the relay UE. The determination may be based on a count of and comparison between the data volume of the relay UE (a first portion of data traffic volume) and the remote UE (a second portion of data traffic volume) and a data threshold, such as ul-DataSplitThreshold. Further, the data volumes for the relay UE and remote UE may be separately compared to the data threshold. This embodiment may be particularly suitable where the relay UE's and the remote UE's Uu PDCP PDU are transmitted over different Uu LCHs of the relay UE. To facilitate the determination, the relay UE may keep two different PDCP and RLC data volume values in its memory (one for its own traffic and one for the remote UE traffic).

The PDCP data volume of the relay UE may be counted based on known PDCP data, while the Uu PDCP data volume of remote UE may be counted based on the size of all PC5 RLC SDU(s) received from the remote UE and pending to be submitted to the relay UE's Uu RLC entity. The remote UE may send its Uu traffic that needs to be relayed with specific LCH ID(s) or to specific relay L2 ID. By checking the LCH ID or the destination L2 ID in the received PC5 MAC PDU header, the relay UE may determine whether a PC5 RLC SDU received from the remote UE carries Uu traffic that needs to be relayed to the NW and the PDCP data volume from remote UE(s) is counted only considering such PC5 RLC SDU(s). When calculating the RLC data volume of the remote/relay UE, the count may be limited to only the RLC SDU/PDU carrying the Uu PDCP of the remote/relay UE.

In embodiments, the adaptation layer may indicate the absolute or relative PDCP PDU size of each PDCP PDU carried in the same RLC SDU, by which the RLC data volume could be counted for each carried PDCP PDU. As an example of this, where there are multiple PDCP PDUs carried in a RLC SDU, the RLC data volume corresponding PDCP PDUi could be calculated as RLC data volume×(size of PDCP PDUi/total size of all PDCP PDUs in the RLC SDU), or approximated by the size of PDCP PDUi indicated in the adaptation layer. Use of adaption layer indicators may enable RLC data volume calculation for relay UE's and remote UE's traffic separately where the relay UE's and the remote UE's Uu PDCP PDU are transmitted over the same Uu LCH of the relay UE.

In embodiments, multiple data threshold values may be used, that is, Relay UE and remote UE may be configured with different ul-DataSplitThreshold values. The relay UE may have a first data threshold (such as a ul-DataSplitThreshold) and the remote UE may have a second data threshold (such as a ul-DataSplitThreshold). The second data threshold for the remote UE (ul-DataSplitThreshold) may be informed to the relay UE, either by the gNB using Uu RRC or by the remote UE using PC5-RRC. The relay UE may then choose to whether send its own data via the secondary RLC entity by comparing its own PDCP and RLC data volume with its own first data threshold (ul-DataSplitThreshold). Similarly, the relay UE may choses whether to send the remote UE data via the secondary RLC entity by comparing the PDCP and RLC data volume of the remote UE with the second data threshold (ul-DataSplitThreshold) of the remote UE.

In embodiments where split secondary RLC entity is configured for the relay UE, the relay UE may determine jointly for both the remote UE and the relay UE whether or not to submit their PDCP PDUs to the split secondary RLC entity of the relay UE. The determination may be made based on a comparison of total data volume of the remote UE and relay UE to a data threshold (such as ul-DataSplitThreshold), regardless of whether the PDCP PDU(s) are generated by the remote UE or the relay UE. The data volume counted by the relay UE may include some or all of the following:

PDCP data volume of the relay UE,

PDCP data volume of the remote UE which is counted based on the size of PC5 RLC SDU(s) received from the remote UE and pending to be submitted to the relay UE's Uu RLC entity as described above, and RLC data volume pending for initial transmission in the primary RLC entity and the split secondary RLC entity where the relay UE's and/or the remote UE's PDCP PDU are transmitted.

When it is determined, on the basis of the comparison, to send PDCP PDU to the split secondary RLC entity, the PDCP PDU of both relay UE and remote UE may be sent to the split secondary RLC entity. Where it is determined not to send PDCP PDU to the split secondary RLC entity, neither the PDCP PDU of the relay UE nor PDCP PDU of the remote UE may be sent to the split secondary RLC entity. Use of a combined determination may be particularly suitable where the relay UE's and the remote UE's Uu PDCP PDU are transmitted over the same Uu Logical Channel (LCH) of the relay UE's RLC entity.

When split secondary RLC entity is configured for the remote UE, which means a primary RLC entity and the split secondary RLC entity are configured for the remote UE. At least one of them may be located in another UE, e.g. the relay UE, the remote UE may determine whether or not to submit its Uu PDCP PDU to the split secondary RLC entity based on the comparison of the remote UE data volume to a data threshold, such as ul-DataSplitThreshold. The data volume of the remote UE may be calculated in several ways:

The data volume may consider the total amount of Uu PDCP data volume and RLC data volume pending for initial transmission in the primary RLC entity and the split secondary RLC entity configured for the remote UE, where only the RLC PDU and/or SDU carriers the Uu PDCP PDU are taken into account in calculating the RLC data volume.

In addition, the data volume may consider any or the sum of the following which is counted by the relay UE:

The Uu PDCP data volume of remote UE that has arrived at the relay UE and pending to be submitted to the relay UE's Uu RLC entity, which is counted as described above, PC5-RLC data volume pending for initial transmission carried on the PC5 radio bearers which are used to transmit Uu PDCP PDUs. These PC5 radio bearers are configured at one or multiple relay UEs, The RLC data volume pending for initial transmission in the relay UE's RLC entity, where only the RLC PDU and/or SDU contains the Uu PDCP PDU from the remote UE are taken into account in calculating the RLC data volume.

Where the relay UE's and the remote UE's Uu PDCP PDU are transmitted in the same Uu RLC SDU of the relay UE's RLC entity, the above said RLC data volume corresponding to the remote UE's traffic could be calculated as described above.

In embodiments, the relay UE may indicate to the remote UE the counted data volume of the remote UE using one or more of the following signalling means:

One or multiple PC5-RRC signalling messages

One or multiple control PDUs in PC5-RLC

One or multiple sidelink MAC CEs

One or multiple control PDUs in an adaptation layer (e.g., the adaptation layer at the relay UE)

The counted data volume of the remote UE indicates the data volume received from the remote UE and still not been sent to the communication network via the Uu interface. In other words, the counted data volume indicates the data volume sent from the remote UE remained in the relay UE. The indication from the relay UE may be sent periodically or in response to a triggering event, e.g., when the change or increase in the data amount exceeds a certain threshold, or when the data volume becomes higher/lower than a threshold. The indication may also be sent in response to a request from the remote UE. Further, instead of indicating the absolute data volume, the relay UE may just indicate whether the data volume is higher/lower than a threshold.

In embodiments where the remote UE requests the relay UE to send the counted data volume of the remote UE, the remote UE may request that the information is sent either periodically or in response to a triggering event, e.g., when the total amount of Uu PDCP data volume and RLC data volume pending for initial transmission in the primary RLC entity and the split secondary RLC entity at the remote UE, where only the RLC PDU and/or SDU carriers the Uu PDCP PDU are taken into account, exceeds a certain threshold. The remote UE may explicitly ask the relay UE to provide the data volume status report via a new PC5 RRC message, or simply introduce an indication to an existing PC5 RRC, for example.

When the remote UE or relay UE sends a request for a data volume status report, it may also include its own data volume status report in the request message. In a situation that a remote UE receives a request from its relay UE including a data volume status report of the relay UE, it sends its data volume status report reflecting data to be sent to the communication network via the relay UE. In other words, the data volume status report of the remote UE indicates the buffer size of data in the remote UE which intended to be sent to the relay UE. Regarding to the data volume status report of the relay UE, it can reflect a) buffered data in the relay UE to be sent to the communication network, or b) only the part related to the remote UE, for example with a flag indicating a) or b), or depending on previous communication, or predefined rules. It would benefit to the remote UE to receive a) when the relay UE and the remote UE are occupying a same logical channel. Under a circumstance that the relay UE receives a data volume status report of the remote UE from the remote UE, asking for a data volume status report of the relay, it may automatically reply with its own data volume status report. Similarly, it can reply with the remaining portion of data received from the remote UE, or the entire data volume buffered in the relay UE to be sent to the communication network.

Alternatively, the data volume status report is sent in a separate message rather than a request message. For example, when the remote UE sends its data volume status report, the relay UE forward it transparently to the base station so that the base station can grant resource of the side link between remote UE and the relay UE.

In relation to any of the embodiments herein, instead of the remote UE receiving an indication from the relay UE of the counted data volume of the remote UE, the remote UE may estimate such data volume by itself. The remote UE may measure periodically how much data volume has been delivered to its lower layers (i.e., PC5 RLC, PC5 MAC and PC5 PHY) by its Uu PDCP layer. The Uu data volume that has been delivered to the relay UE may then be estimated as the measured data volume minus PC5-RLC data volume. A filter may be applied to smooth the variation of the measured data volume that has been delivered to the relay UE.

Although discussed above in the context of a single split secondary RLC entity, the disclosure may also be applied where more than one split secondary RLC entity is configured for the split bearer.

In embodiments, a method performed by a remote UE supportive of D2D communications is disclosed. The remote UE is capable of establishing a connection to a communication network via a relay UE and the method comprises:

determining a size of a data traffic volume related to the UE, wherein the determined size belongs to a second portion of data traffic volume being received by the relay UE connected to the UE.

It could be understood by the previous embodiments that the data traffic volume being received by the relay UE mean the data received however still remained within the relay UE, and the data is to be sent by the relay UE to the base station via Uu interface.

In embodiments, the determining size of the second portion can be one of:

a) sending a request to the relay UE, and receiving an indication of the size of the second portion from the relay UE;

b) receiving an indication of the size of the second portion periodically from the relay UE;

c) receiving an indication of the size of the second portion from the relay UE, when a triggered event happens; and d) estimating the size based on measurement of delivered data to its lower layers by PDCP layer;

Under circumstance a), a data volume status report of the remote UE is included in the request. In embodiments, when the remote UE is configured with a primary Radio Link Control, RLC, entity and a split secondary Radio Link Control, RLC, entity, it determines whether or not to send data to both or one of the primary and the split secondary RLC entity. For example, when it is determined that the data (at least part) is to be sent to the primary RLC entity, under the circumstance that the primary RLC entity is located within the remote UE, the data (at least part) is sent from PDCP layer to RLC layer in the remote UE; under the circumstance that the primary RLC entity is located in the relay UE, the data (at least part) is sent from the remote UE to the relay UE.

Figure 7:
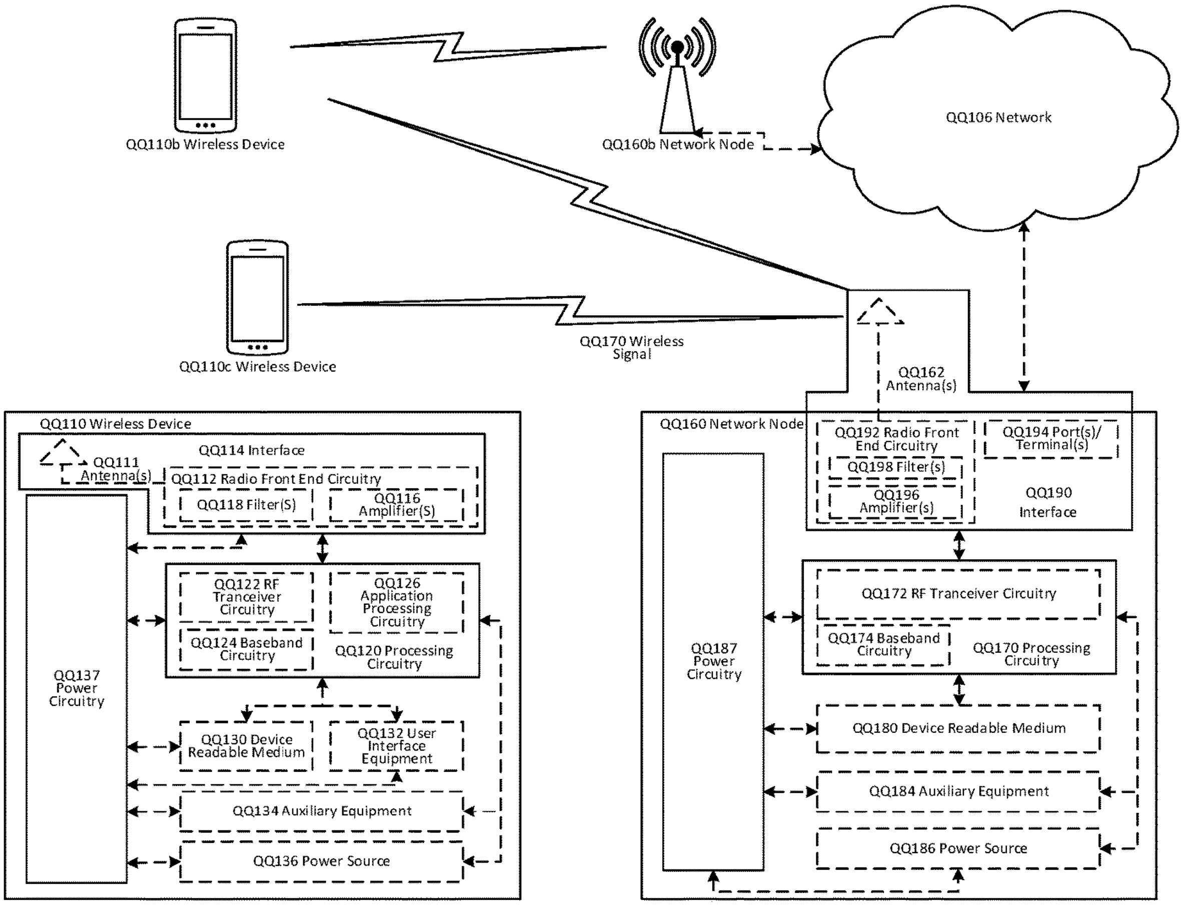
FIG. 7 shows a wireless network in accordance with some embodiments.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments apart of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 7 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). The UE may be a relay UE or a remote UE, as discussed herein. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 8:
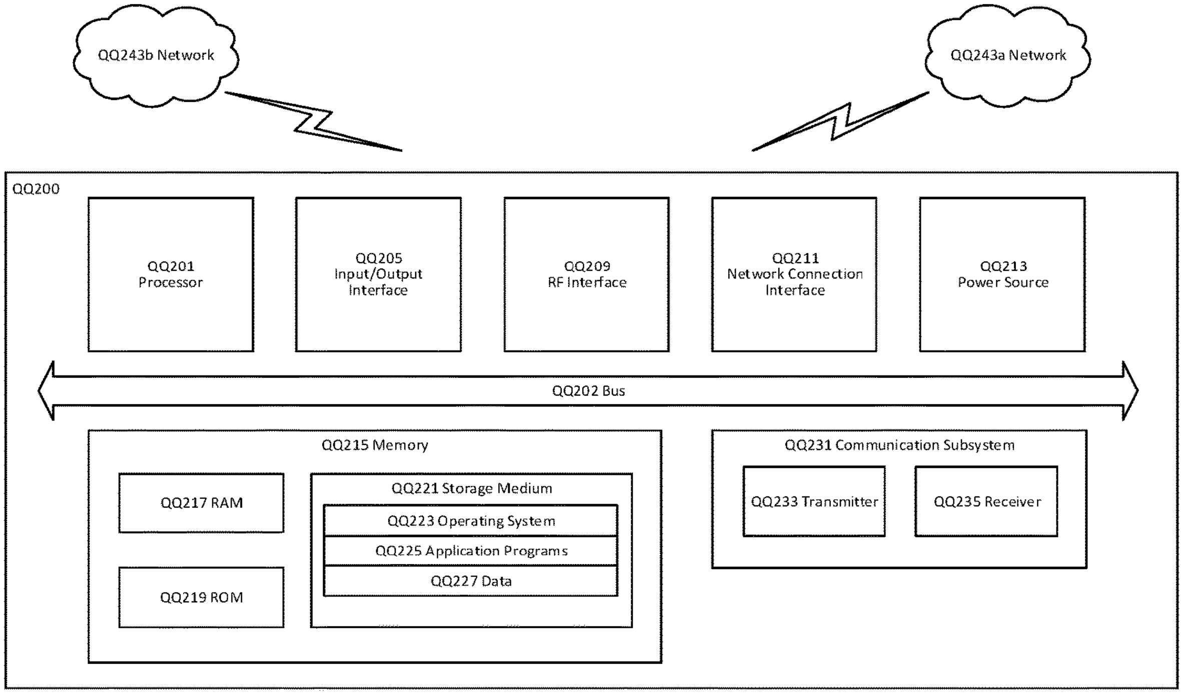
FIG. 8 shows a User Equipment in accordance with some embodiments.

FIG. 8 illustrates one embodiment of a UE in accordance with various aspects described herein. The UE may be a relay UE or a remote UE, as discussed herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ200 may be any UE identified by the 3$^{rd}$ Generation Partnership Project (3GPP), including a NB-IoT UE, a machine type communication (MTC) UE, and/or an enhanced MTC (eMTC) UE. UE QQ200, as illustrated in FIG. 8, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 8, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 9:
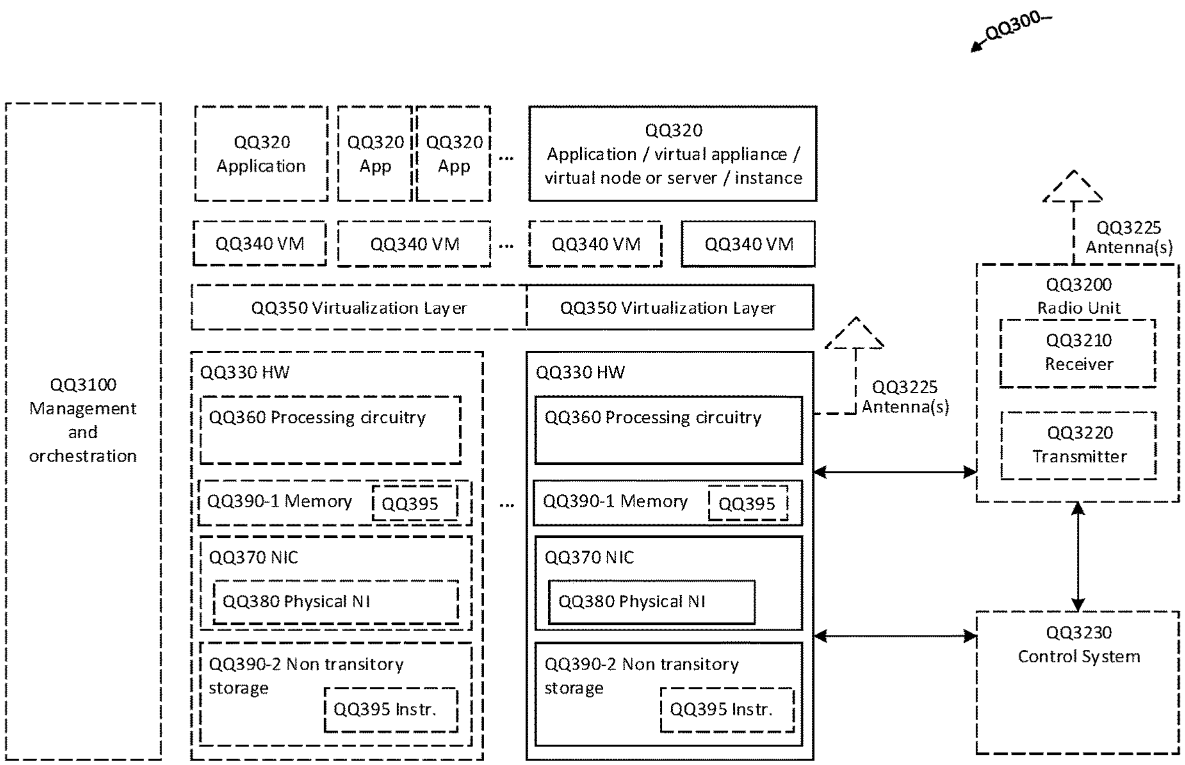
FIG. 9 shows a virtualization environment in accordance with some embodiments.

FIG. 9 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 9, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network element (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 9.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 10:
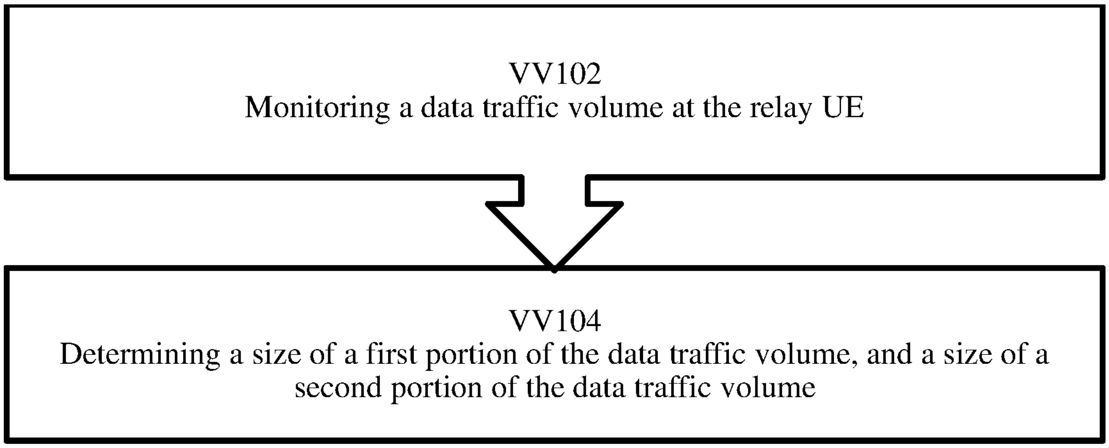
FIG. 10 shows a method performed by a relay UE for data volume counting in accordance with some embodiments of the present disclosure.

FIG. 10 depicts a method in accordance with particular embodiments, the method begins at step VV102 with monitoring, by a relay UE supportive of D2D communications, of a data traffic volume at the relay UE. The method may further comprise, at step VV104, determining a size of a first portion of the data traffic volume related to the relay UE, and a size of a second portion of the data traffic volume related to a remote UE that is connected to the relay UE.

Figure 11:
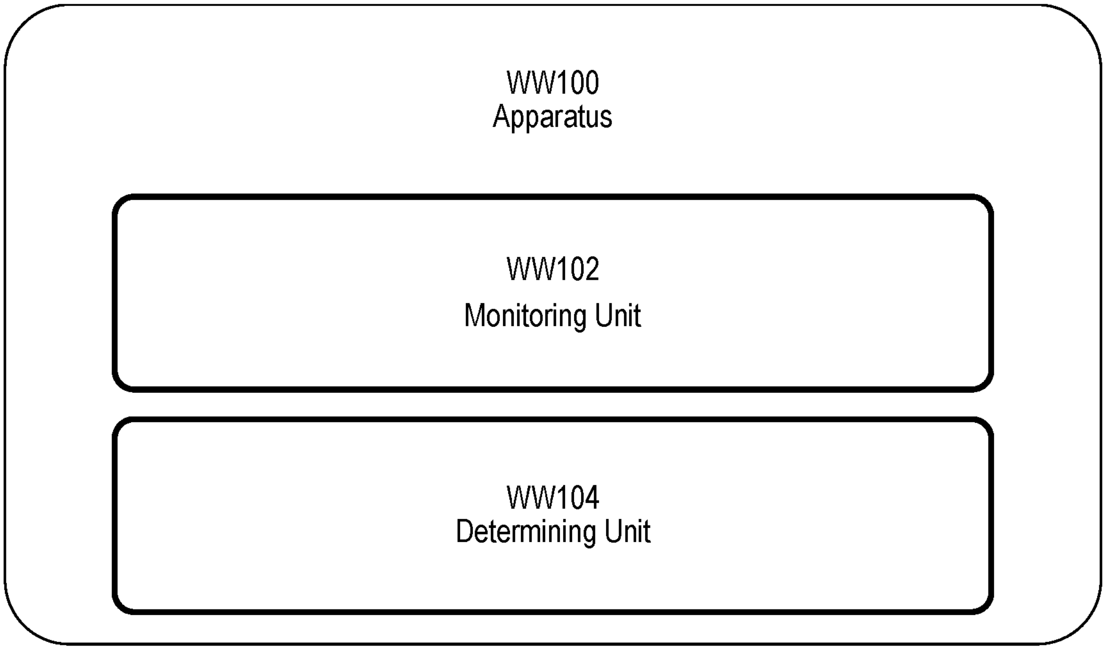
FIG. 11 schematically illustrate a block diagram of an apparatus according to some embodiments of the present disclosure.

FIG. 11 illustrates a schematic block diagram of an apparatus WW100 in a wireless network (for example, the wireless network shown in FIG. 7). The apparatus may a wireless device (e.g., wireless device QQ110 shown in FIG. 7). Apparatus WW100 is operable to carry out the example method described with reference to FIG. 10 and possibly any other processes or methods disclosed herein. It is also to be understood that the method of FIG. 10 is not necessarily carried out solely by apparatus WW100. At least some operations of the method can be performed by one or more other entities.

Apparatus WW100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause monitoring unit WW102, determining unit WW104 and any other suitable units of apparatus WW100 to perform corresponding functions according one or more embodiments of the present disclosure.

As illustrated in FIG. 11, apparatus WW100 includes monitoring unit WW102 and determining unit WW104. Monitoring unit WW102 is configured to monitor a data traffic volume at the relay UE. Determining unit WW104 is configured to determine a size of a first portion of the data traffic volume related to the relay UE, and a size of a second portion of the data traffic volume related to a remote UE that is connected to the relay UE.

Figure 12:
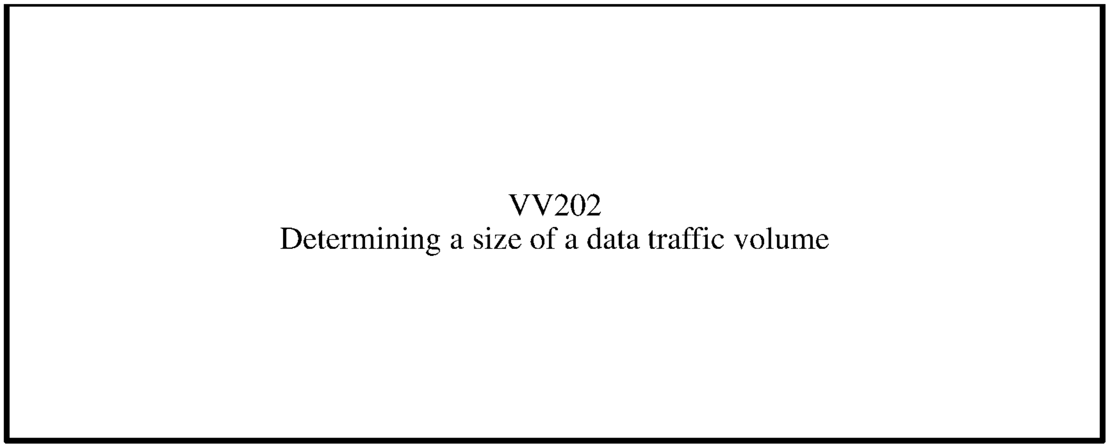
FIG. 12 shows a method performed by a UE for data volume counting in accordance with some embodiments of the present disclosure.

FIG. 12 depicts a method in accordance with particular embodiments, the method begins at step VV202 with determining, by a UE supportive of D2D communications and that is capable of establishing a connection to a communication network via a relay UE (the UE may therefore be referred to as a remote UE), of a data traffic volume related to the UE (that is, the remote UE). The determined size to a second portion of data traffic volume being received and to be sent by the relay UE connected to the UE.

Figure 13:
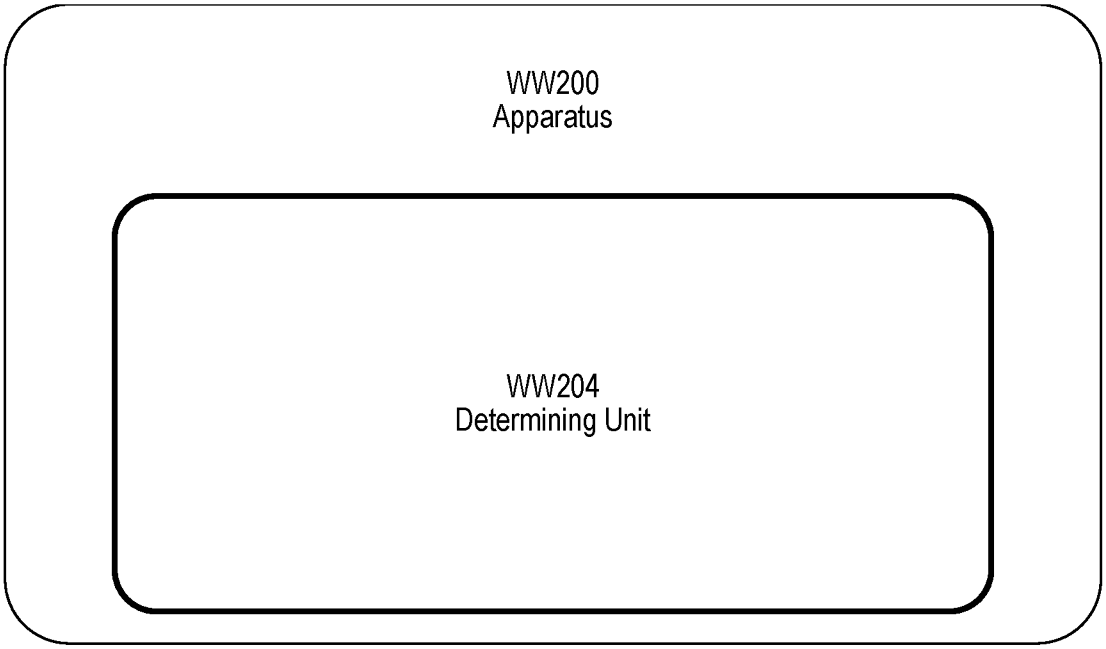
FIG. 13 schematically illustrate a block diagram of an apparatus according to some embodiments of the present disclosure.

FIG. 13 illustrates a schematic block diagram of an apparatus WW200 in a wireless network (for example, the wireless network shown in FIG. 7). The apparatus may a wireless device (e.g., wireless device QQ110 shown in FIG. 7). Apparatus WW200 is operable to carry out the example method described with reference to FIG. 12 and possibly any other processes or methods disclosed herein. It is also to be understood that the method of FIG. 12 is not necessarily carried out solely by apparatus WW200. At least some operations of the method can be performed by one or more other entities.

Apparatus WW200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit WW202 and any other suitable units of apparatus WW200 to perform corresponding functions according one or more embodiments of the present disclosure.

As illustrated in FIG. 13, apparatus WW200 includes determining unit WW202. Determining unit WW202 is configured to determine a size of a data traffic volume related to the UE. The determined size belongs to a second portion of data traffic volume being received and to be sent by a relay UE connected to the UE, wherein the UE is capable of establishing a connection to a communication network via the relay UE.

Hereinafter, the exemplary embodiments of the present disclosure will be illustrated by taking UL (uplink) split radio bearer scenarios as examples. It should be noted that the exemplary embodiments of the present disclosure may also be applied in the DL (downlink) split radio bearer scenarios. The difference is only in that the direction of data transmission is opposite to the corresponding UL split radio bearer scenarios. Therefore, detailed descriptions thereof may refer to the UL (uplink) split radio bearer scenarios, and will be omitted here.

In case a remote UE is configured with UL split radio bearer (RB), for a UL split RB, its UL PDCP PDUs are split among multiple cell groups (CGs). For example, MCG and SCG in a DC scenario, but not only limited to two CGs. For each CG, there is at least RLC entity configured for this UL split radio bearer. Here, a CG includes at least one network node (e.g., eNB, gNB etc.).

In case the remote UE is connecting to a relay UE, there are several exemplary scenarios (i.e., deployment options) regarding how to place CGs and the corresponding RLC entities, which will be described later with reference to FIGS. 16 to 18.

Hereinafter, a method for data split at a relay UE according to some embodiments of the present disclosure will be described in detail with reference to FIG. 14.

Figure 14:
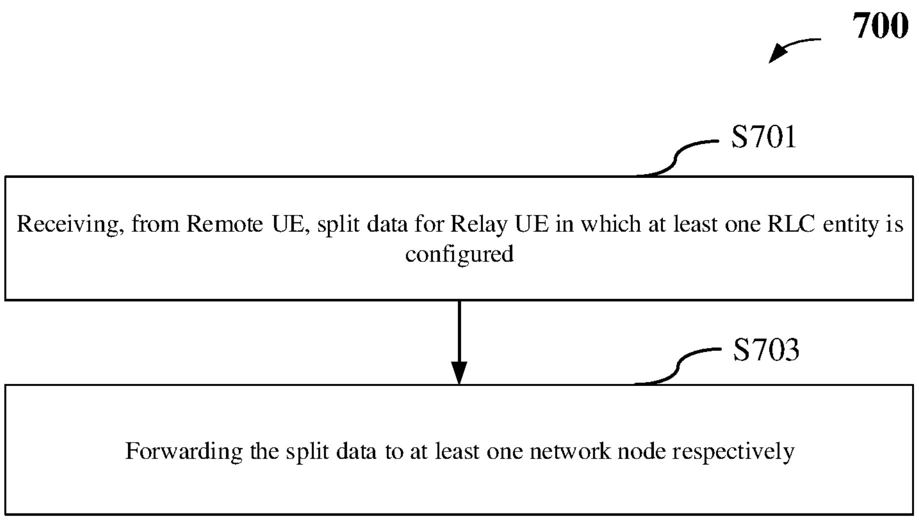
FIG. 14 shows a method performed by a relay UE for data split in accordance with some embodiments of the present disclosure.

FIG. 14 schematically illustrates a general method 700 for data split at a relay UE according to an exemplary embodiment of the present disclosure. As shown in FIG. 14, the method 700 includes steps S701 and S703.

In step S701, the relay UE receives split data for at least one RLC entity from the remote UE. Then, in step S703, the relay UE forwards the split data to at least one network node respectively.

Figure 16:
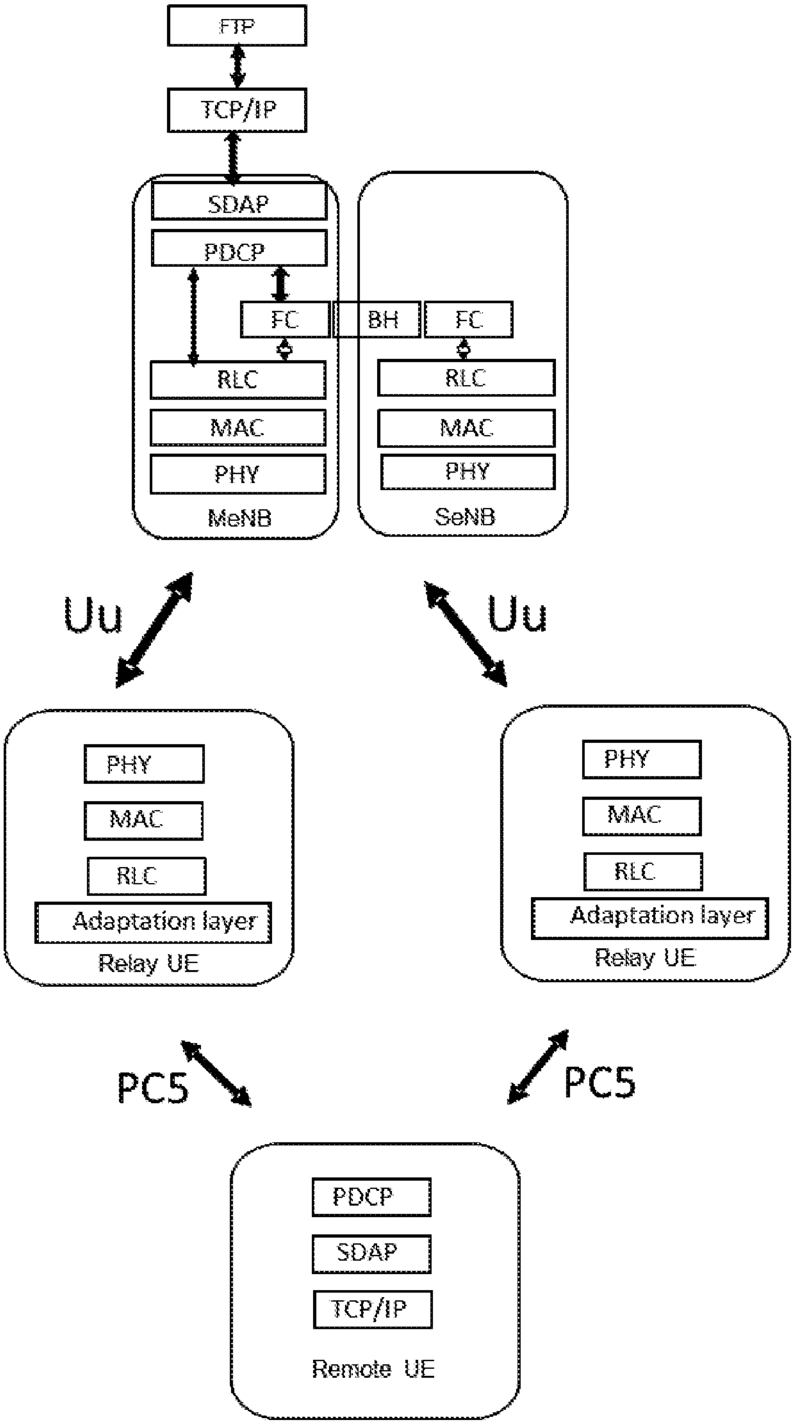
FIG. 16 schematically illustrates a first exemplary bearer split scenario in which methods for data split at a relay UE and at a remote UE according to some embodiments of the present disclosure are applied.

In an exemplary scenario as shown in FIG. 16, in which at most one network node (here, "network node" is also described as "CG", when one CG includes one network node, same below) is connected to the remote node via a relay UE, the remote UE can be connecting to multiple relay UEs at the same time. Here, each relay UE is connecting to a separate network node. Alternatively, different relay UEs may be served by the same CG in which different network nodes are included, while the UL split RB of the remote UE is still associated with multiple RLC/MAC entities.

In this exemplary scenario as shown in FIG. 16, one RLC entity may be configured in the relay UE, and the remote UE may be connected to one of more than one network node (e.g., two network nodes in the example of FIG. 16, such as MeNB and SeNB, or MgNB and SgNB (not shown)) via the relay UE. Here, the remote UE may be connected to a plurality of relay UEs.

Thus, the step S701 may further include: receiving, from the remote UE, the split data for the RLC entity that is configured in the relay UE.

Accordingly, the step S703 may further include: forwarding the split data for the RLC entity to the corresponding network node (e.g., MeNB in FIG. 16) over one connection between the RLC entity and a peer RLC entity configured in the corresponding network node.

Figure 17:
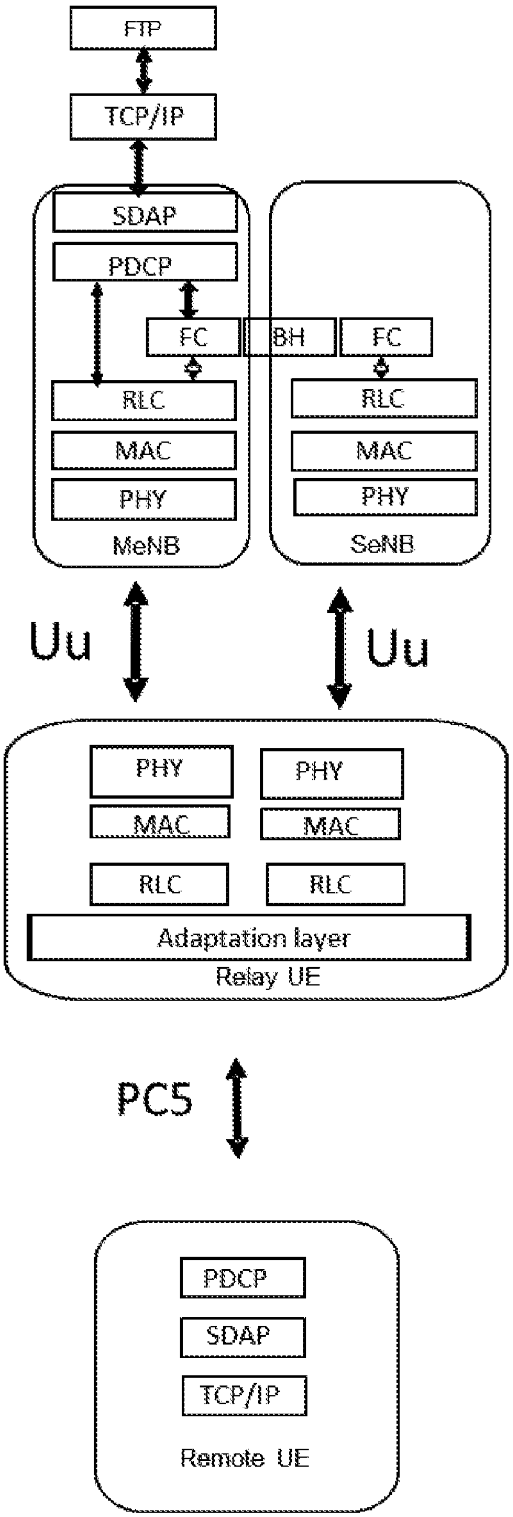
FIG. 17 schematically illustrates a second exemplary bearer split scenario in which methods for data split at a relay UE and at a remote UE according to some embodiments of the present disclosure are applied.

In an exemplary scenario as shown in FIG. 17, more than one network node is connected via a relay UE. For example, in case of DC (Dual Connectivity), a relay UE can connect to both a master network node (e.g., MeNB, MgNB etc., also described as described as MCG) and a secondary network node (e.g., SeNB, SgNB etc., also described as SCG). Therefore, it is sufficient for the remote UE to connect to a single relay UE for a UL split RB in case of DC.

In this exemplary scenario as shown in FIG. 17, more than one RLC entity is configured in the relay UE, and the remote UE is connected to more than one network node (e.g., two network nodes in the example of FIG. 16, such as MeNB and SeNB, or MgNB and SgNB (not shown)) via the relay UE.

Thus, the step S701 may further include: receiving, from the remote UE, the split data respectively for the more than first RLC entity.

Accordingly, the step S703 may further include: forwarding, to the more than one network node respectively, the split data respectively for the more than one RLC entity over corresponding connections. Here, each of the connections is between one of the more than one RLC entity and a peer RLC entity configured in the corresponding one of the more than one network node.

The exemplary scenario as shown in FIG. 17 may be further expanded. For example, if the number of the network nodes is larger than 2 (e.g., in future NR releases), the remote UE may be connected to more than one relay UE.

For example, it is assumed that the remote UE is connected to 4 network nodes via the 2 relay UEs, respective 2 of the 4 network nodes may be connected to the remote node via respective one of the 2 relay UEs (like the connections between the two network nodes and the relay node as shown in FIG. 17); alternatively, one of the 4 network nodes may be connected via one of the 2 relay UEs (like the connection between one network node and one relay node as shown in FIG. 16), and 3 of the 4 network nodes may be connected via the other one of the 2 relay UEs, in which case, three RLC entities are configured in this relay UE (not shown).

It should be noted that the above scenarios are exemplary without any limitation. The skilled in the art may contemplate any appropriate scenarios based on the exemplary scenario, all of which are within the scope of the present disclosure.

In the above extended exemplary scenario, more than one relay UE may be each configured with at least one RLC entity, and the remote UE may be connected to more than one network node via those relay UEs.

Thus, the step S701 may further include: the more than one relay UE receiving, from the remote UE, the split data for their configured RLC entities.

Accordingly, the step S703 may further include: forwarding, to the more than one network node respectively, the split data respectively for the RLC entities over corresponding connections. Here, each of the connections is between one of the more than one RLC entity and a peer RLC entity configured in the corresponding one of the more than one network node.

In an exemplary embodiment, the more than one network nodes (e.g., two network nodes in the example of FIG. 17, such as MeNB and SeNB, or MgNB and SgNB (not shown)) are the same for the relay UE and remote UE, (re)configuration of those network nodes are performed simultaneously for the two UEs. In another exemplary embodiment, one of the network nodes is the same for the relay UE and remote UE, while another one of the network nodes may be different, which means that (re)configuration of the other one of the network nodes is performed independently for the two UEs. In yet another exemplary embodiment, the more than one network nodes may be different for the relay UE and remote UE, meaning that (re)configuration of the more than one network nodes are performed independently for the two UEs.

Figure 18:
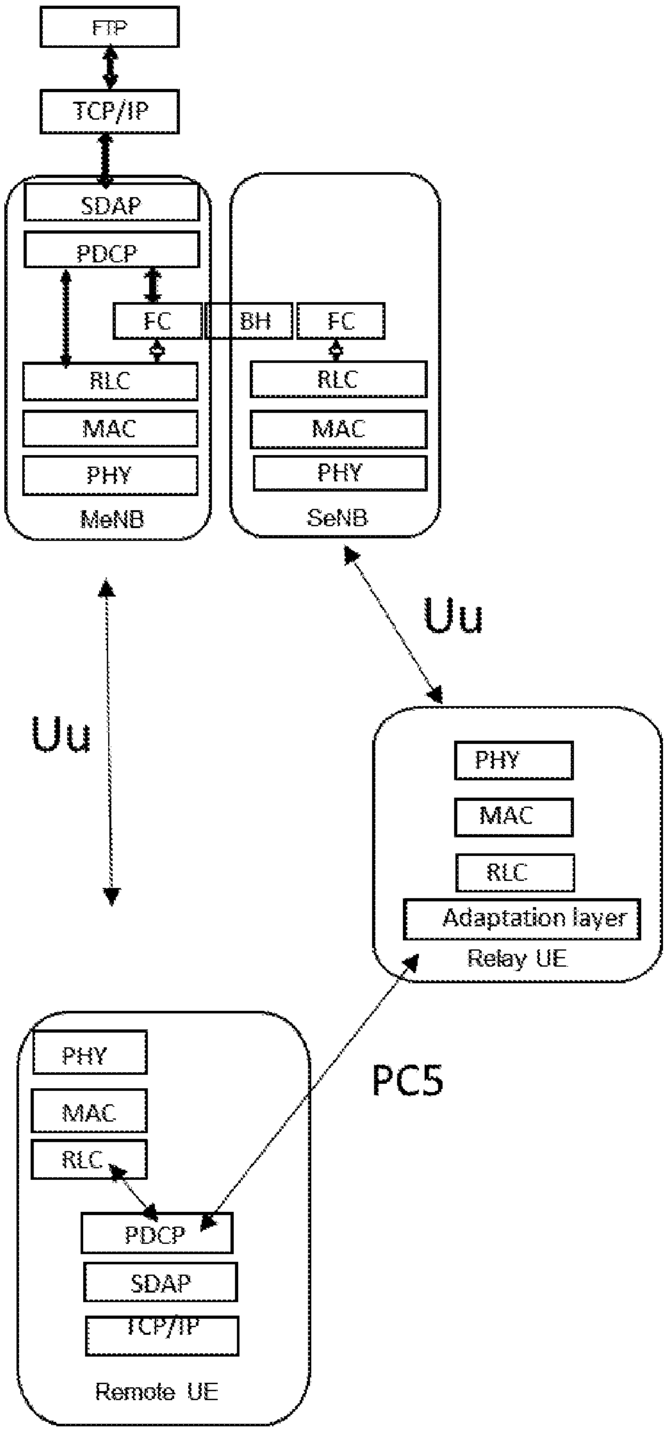
FIG. 18 schematically illustrates a third exemplary bearer split scenario in which methods for data split at a relay UE and at a remote UE according to some embodiments of the present disclosure are applied.

In an exemplary scenario as shown in FIG. 18, the remote UE is connected to the network node directly and via a relay UE. Here, the remote UE is configured with a UL split radio bearer and the radio bearer on its PDCP layer is split into one or multiple RLC entities located at the relay UE and one or multiple RLC entities located at the network node (i.e., where the network node can act as MCG or SCG in case DC is enabled) meaning that the remote UE has a direction connection to the network node, while one or multiple connections to the same or different network node via one or multiple relay UEs.

In an exemplary embodiment, the remote UE may be directly connected to the network node (e.g., MCG) with one leg of the split radio bearer and with the relay UE (i.e., connected to e.g. the SCG or MCG, or both) with the other leg of the split radio bearer.

In another exemplary embodiment, the remote UE may be directly connected to the network node (e.g., SCG) with one leg of the split radio bearer and with the relay UE (i.e., connected to e.g. the SCG or MCG, or both) with the other leg of the split radio bearer.

In yet another exemplary embodiment, both the remote UE and relay UE may be connected to the same CG in which more than one network nodes (e.g., two network nodes in the example of FIG. 18, such as MeNB and SeNB, or MgNB and SgNB (not shown)) are included, i.e., the remote UE is connected to the CG via a direct path and an indirect path via the relay UE. For example, the remote UE is connected to the MeNB via a direct path, and is connected to the SeNB via an indirect path via the relay UE, wherein the MeNB and the SeNB are included in one CG.

Therefore, in this exemplary scenario as shown in FIG. 18, there are split data over at least one direct connection between the remote UE and the more than one network node.

The exemplary scenario as shown in FIG. 18 may be further expanded. For example, there may be at least one indirect path between the remote node and the network node via the relay UE, and the connections between the relay UE(s) and the network node(s) may refer to the above descriptions related to at least the scenarios as shown in FIGS. 16 and 17.

As described above, the more than one network node may be included in the same cell group or different cell groups.

In an exemplary embodiment, the cell group is at least one of: a master cell group (MCG) or a secondary cell group (SCG).

In an exemplary embodiment, the method further includes a process of determining a UE as a relay UE.

The process may include: receiving, from the remote UE, a request message for relay discovery; and responding the remote UE with a reply message that comprises at least one of: radio quality measurement related information on a sidelink connection between the UE and the remote UE, radio quality measurement related information on a cellular link connection between the relay UE and the network node, and a UE ID of the UE.

In an exemplary embodiment, the UE may be selected by the remote UE as a relay UE based on at least one of the sidelink connection radio quality, the cellular link connection radio quality, or a response time of the UE, which will be described in detail later.

Accordingly, a method for data split at a remote UE according to an exemplary embodiment of the present disclosure will be described in detail with reference to FIG. 15.

Figure 15:
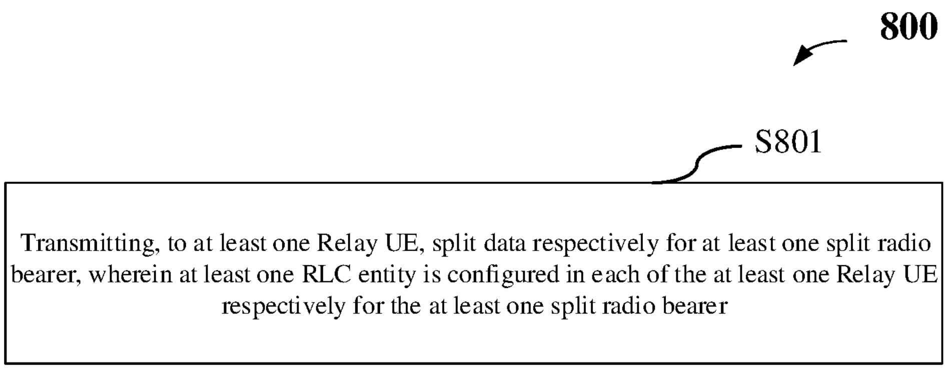
FIG. 15 shows a method performed by a remote UE for data split in accordance with some embodiments of the present disclosure.

FIG. 15 schematically illustrates a method 800 for data split at a remote UE according to an exemplary embodiment of the present disclosure. As shown in FIG. 15, the method 800 includes at least a step S801.

In step S801, the remote UE transmits, to at least one relay UE, split data respectively for at least one split radio bearer, wherein at least one first RLC entity is configured in each of the at least one relay UE respectively for the at least one split radio bearer.

Hereinafter, the process for data split according to exemplary embodiments of the present disclosure will be described in detail with reference to the exemplary scenarios as shown in FIGS. 16 to 18.

In the exemplary scenario as shown in FIG. 16, one first RLC entity is configured in the relay UE, and the remote UE is connected to one of more than one network node via a corresponding one of more than one relay UE.

Thus, the step S801 may further include: transmitting, to the more than one relay UE respectively, the split data respectively for the more than one relay UE.

In the exemplary scenario as shown in FIG. 17, more than one RLC entity is configured in the relay UE, and the remote UE is connected to more than one network node via the relay UE.

Thus, the step S801 may further include: transmitting, to the relay UE, the split data respectively for the more than one RLC entity.

As described previously, the exemplary scenario as shown in FIG. 17 may be further expanded. For example, if the number of the network nodes is larger than 2 (e.g., in future NR releases), the remote UE may be connected to more than one relay UE.

In this extended exemplary scenario, more than one relay UE may be each configured with at least one RLC entity, and the remote UE may be connected to more than one network node via those relay UEs.

Thus, the step S801 may further include: transmitting the split data to the more than one relay UE that is each configured with at least one RLC entity.

In the exemplary scenario as shown in FIG. 18, the remote UE is connected to the network node directly and via a relay UE.

Accordingly, the step S801 may further include: transmitting, over at least one direct connection between the remote UE and at least one of the more than one network node, split data for the at least one network node.

The method 800 may further include a process of selecting/determining a predetermined number of relay UEs. In an exemplary embodiment, the process generally includes: transmitting, to a set of UEs, a request message for relay discovery; and receiving one or more reply messages respectively from one or more of the set of UEs, wherein the reply message comprises at least one of: radio quality measurement related information on a sidelink connection between the corresponding UE and the remote UE, radio quality measurement related information on a cellular link connection between the corresponding UE and the network node, and a UE ID of the corresponding UE.

In an exemplary embodiment, the method further includes: determining the at least one UE among the one or more UEs as relay UE(s) based on at least one of the sidelink connection radio quality, the cellular link connection radio quality, or a response time of the corresponding UE.

In an exemplary embodiment, the process may include: transmitting, to one of a set of UEs, a request message for relay discovery; and receiving a reply message from the UE, wherein the reply message comprises at least one of: radio quality measurement related information on a sidelink connection between the UE and the second UE, radio quality measurement related information on a cellular link connection between the UE and the network node, and a UE ID of the UE.

Then, the remote UE determines the UE among the set of UEs as a relay UE based on at least one of the sidelink connection radio quality, the cellular link connection radio quality, or a response time of the UE, and repeats, for each of the remaining UEs, the steps of transmitting a request message for relay discovery, receiving a replay message, and determining as a relay UE to determine the at least one relay UE.

In an exemplary embodiment, the number of the at least one relay UE is determined by system configuration.

Hereinafter, an exemplary relay UE selection process is described.

The remote UE can select one or multiple relay UEs (e.g., M relay UEs) for a UL split RB. For example, in case of dual connectivity, the remote UE can select one or two relay UEs from the set of candidate relay UEs out of all the relay UEs, the relay UE connecting to MCG of the remote UE can be named as the primary relay UE, while other relay UEs are named as secondary relay UEs. The primary relay UE could be the relay UE connecting to the MCG of the remote UE with the strongest cellular connection.

In an exemplary scenario as shown in FIG. 16, the remote UE may apply at least one of the below options to discover relay UEs.

Option 1: the remote UE initiates a separate discovery procedure for each relay UE. In the discovery request message, the remote UE may include information on the service to be relayed, service QoS requirements such as data rate or latency requirement, remote UE ID, type of the relay UE (primary or secondary) etc. Upon reception of the request message, one or multiple relay UEs may reply. The reply message may carry at least one of relay UE ID, radio quality measurement indicator on the sidelink connection between the remote UE and the UE replies, radio quality measurement indicator on the cellular link of the UE to the RAN. The remote UE selects the most suitable one as a relay UE applying at least one of the below alternatives, e.g., Alternative 1: select the one with strongest sidelink connection Alternative 2: select the one with strongest cellular connection to the RAN Alternative 3: select the one which has replied first, i.e., has the fastest response time.

After determining a relay UE, the remote UE initiates another discovery procedure to discover next relay UE by repeating the above procedure.

Option 2: the remote UE initiates a single discovery procedure for all relay UEs. In the discovery request message, the relay UE may include information on the service to be relayed, service QoS requirements such as data rate or latency requirement, remote UE ID, number of cellular connections to the RAN that the remote UE need to establish potentially via relay UEs and/or number of relay UEs requested etc. Upon reception of the request message, one or multiple relay UEs may reply. The remote UE may select relay UEs applying at least one of the below alternatives, e.g., Alternative 1: select the UEs following a decreasing order of sidelink connection radio quality Alternative 2: select the UEs following a decreasing order of cellular connection radio quality Alternative 3: select the UEs following an increasing order of the response time, In an exemplary embodiment, the remote UE may select its primary MCG and its primary relay UE by itself, e.g. the primary relay UE is the UE which replies first, and the MCG is the CG serving the primary relay UE, the secondary relay UEs are the UEs which reply later than the primary relay UE and SCG is the CG serving the secondary relay UE, etc. Another option is that e.g., the gNBs serving the selected relay UEs determine which CG out of the CGs serving the selected relay UEs should be the primary MCG for the remote UE and which should be the SCG, etc., where inter-gNB coordination may be needed.

The remote UE may initiate a second discovery procedure to discover more relay UEs if there are no sufficient number of relay UEs selected in the first discovery procedure. In the exemplary scenario as shown in FIG. 17, a remote UE may select one or multiple relay UEs for a UL split RB depending on how many CGs are configured to the split RB. In case of dual connectivity, it is sufficient for the remote UE to select a single relay UE for a UL split RB. In this scenario, a single Uu DRB of the remote UE needs to be mapped to multiple RLC channels and/or logical channels in the same relay UE.

As an embodiment, which deployment option of split Uu UL RB is applied for a UE is configured by the network node via signaling such as RRC signaling, MAC CE or DCI. Alternatively, the network node may configure some rules on which deployment option to choose, e.g., choose deployment option 2 when relay UE has a lot of traffic of its own to transmit and/or the PC5 link quality between remote UE and relay UE is better than the Uu link quality between relay UE and serving network node.

As an embodiment, a UE capability bit may be defined for a UE indicating whether the UE supports split Uu UL RB for the relayed traffic in case of UE to network relay. The split RB is connected to the network node via a relay UE.

As an embodiment, for a remote UE, a split Uu UL RB may be only configured for services with certain QoS requirements including at least one of: data rate being above a configured threshold; or latency requirement is below a configured threshold.

Figure 19:
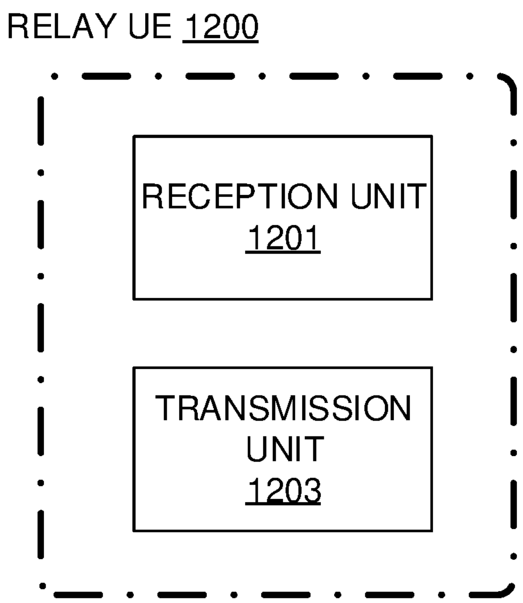
FIG. 19 schematically illustrate a block diagram of a relay UE according to some embodiments of the present disclosure.

Hereinafter, a structure of a relay UE according to an exemplary embodiment of the present disclosure will be described with reference to FIG. 19. FIG. 19 schematically shows a block diagram of a relay UE 1200 according to an exemplary embodiment of the present disclosure. The relay UE 1200 in FIG. 19 may perform the method 700 as described previously with reference to FIGS. 14 and 16 to 18. Accordingly, some detailed description on the RL UE 1200 may refer to the corresponding description of the method 700 in FIG. 14 in conjunction with the exemplary scenarios as shown in FIGS. 16 to 18 as previously discussed, and thus will be omitted here for simplicity.

As shown in FIG. 19, the relay UE 1200 includes a reception unit 1201 and a transmission unit 1203. The reception unit 1201 is configured to receive split data for at least one first RLC entity from a remote UE. The transmission unit 1203 is configured to forward the split data to at least one network node respectively.

Figure 20:
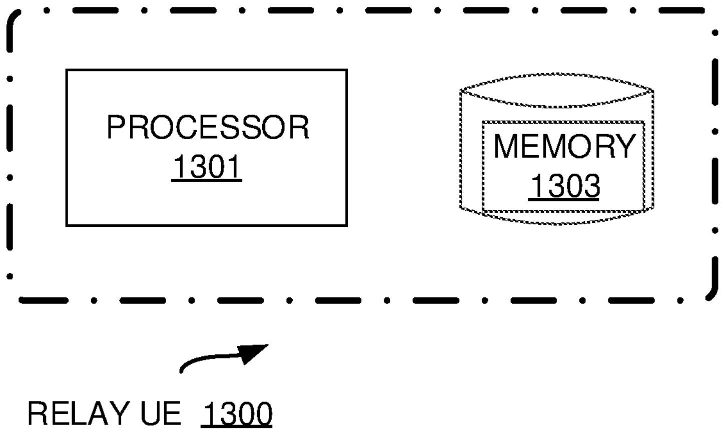
FIG. 20 schematically illustrate another block diagram of a relay UE according to some embodiments of the present disclosure.

Hereinafter, another structure of a relay UE according to an exemplary embodiment of the present disclosure will be described with reference to FIG. 20. FIG. 20 schematically shows another block diagram of a relay UE 1300 according to an exemplary embodiment of the present disclosure. The relay UE 1300 in FIG. 20 may perform the method 700 as described previously with reference to FIGS. 14 and 16 to 18. Accordingly, some detailed description on the RL UE 1200 may refer to the corresponding description of the method 700 in FIG. 14 in conjunction with the exemplary scenarios as shown in FIGS. 16 to 18 as previously discussed, and thus will be omitted here for simplicity.

As shown in FIG. 20, the relay UE 1300 includes at least one processor 1301 and at least one memory 1303. The at least one processor 1301 includes e.g., any suitable CPU (Central Processing Unit), microcontroller, DSP (Digital Signal Processor), etc., capable of executing computer program instructions. The at least one memory 1303 may be any combination of a RAM (Random Access Memory) and a ROM (Read Only Memory). The at least one processor memory 1303 may also include persistent storage, which, for example, can be any single one or combination of magnetic memory, optical memory, or solid state memory or even remotely mounted memory.

The at least one memory 1303 stores instructions executable by the at least one processor 1301, whereby the relay UE 1300 is operative to perform the method 700 as described earlier respectively in conjunction with FIGS. 14 and 16 to 18. Detailed description thereof thus will be omitted for simplicity.

In particular, the instructions, when loaded from the at least one memory 1303 and executed on the at least one processor 1301, may cause the relay UE 1300 to: receive split data for at least one first RLC entity from a second UE; and forward the split data to at least one network node respectively.

Figure 21:
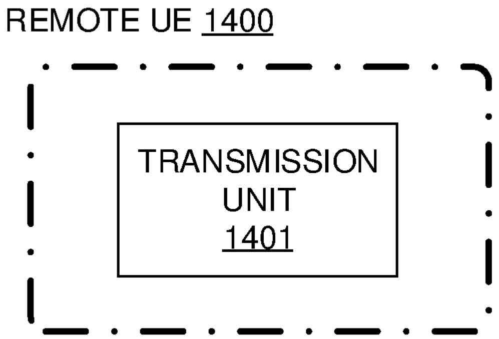
FIG. 21 schematically illustrate a block diagram of a remote UE according to some embodiments of the present disclosure.

Hereinafter, a structure of a remote UE according to an exemplary embodiment of the present disclosure will be described with reference to FIG. 21. FIG. 21 schematically shows a block diagram of a remote UE 1400 according to an exemplary embodiment of the present disclosure. The remote UE 1400 in FIG. 21 may perform the method 800 as described previously with reference to FIGS. 15 to 18. Accordingly, some detailed description on the remote UE 1400 may refer to the corresponding description of the method 800 in FIG. 15 in conjunction with the exemplary scenarios as shown in FIGS. 16 to 18 as previously discussed, and thus will be omitted here for simplicity.

As shown in FIG. 21, the remote UE 1400 at least includes a transmission unit 1401. The transmission unit 1401 is configured to transmit, to at least one relay UE, split data respectively for at least one split radio bearer, wherein at least one first RLC entity is configured in each of the at least one relay UE respectively for the at least one split radio bearer.

Figure 22:
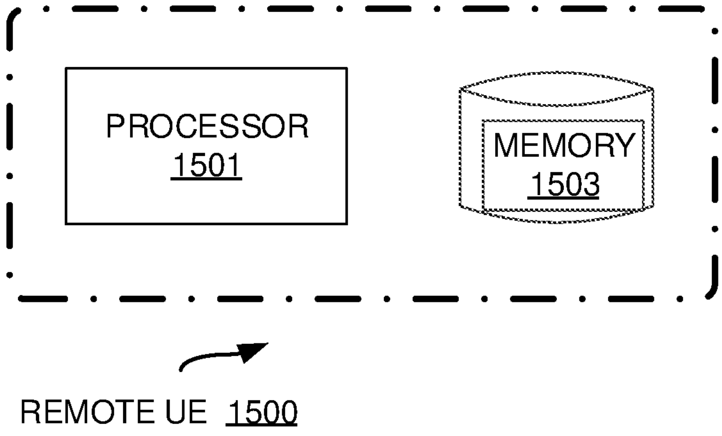
FIG. 22 schematically illustrate another block diagram of a remote UE according to some embodiments of the present disclosure.

Hereinafter, another structure of a remote UE according to an exemplary embodiment of the present disclosure will be described with reference to FIG. 22. FIG. 22 schematically shows another block diagram of an RM UE 1500 according to an exemplary embodiment of the present disclosure. The remote UE 1500 in FIG. 22 may perform the method 800 as described previously with reference to FIGS. 15 to 18. Accordingly, some detailed description on the remote UE 1400 may refer to the corresponding description of the method 800 in FIG. 15 in conjunction with the exemplary scenarios as shown in FIGS. 16 to 18 as previously discussed, and thus will be omitted here for simplicity.

As shown in FIG. 22, the remote UE 1500 includes at least one processor 1501 and at least one memory 1503. The at least one processor 1501 includes e.g., any suitable CPU (Central Processing Unit), microcontroller, DSP (Digital Signal Processor), etc., capable of executing computer program instructions. The at least one memory 1503 may be any combination of a RAM (Random Access Memory) and a ROM (Read Only Memory). The at least one processor memory 1503 may also include persistent storage, which, for example, can be any single one or combination of magnetic memory, optical memory, or solid state memory or even remotely mounted memory.

The at least one memory 1503 stores instructions executable by the at least one processor 1501, whereby the remote UE 1500 is operative to perform the method 800 as described earlier respectively in conjunction with FIGS. 15 to 18. Detailed description thereof thus will be omitted for simplicity.

In particular, the instructions, when loaded from the at least one memory 1503 and executed on the at least one processor 1501, may cause the RM UE 1500 to transmit, to at least one relay UE, split data respectively for at least one split radio bearer, wherein at least one first RLC entity is configured in each of the at least one relay UE respectively for the at least one split radio bearer.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 1301 causes the relay UE 1300 to perform the actions, e.g., of the procedure described earlier in conjunction with FIG. 14; or code/computer readable instructions, which when executed by the at least one processor 1501 causes the remote UE 1500 to perform the actions, e.g., of the procedures described earlier respectively in conjunction with FIG. 15.

The computer program product may be configured as a computer program code structured in computer program modules. The computer program modules could essentially perform the actions of the flow illustrated in any of FIGS. 14 to 18.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 23:
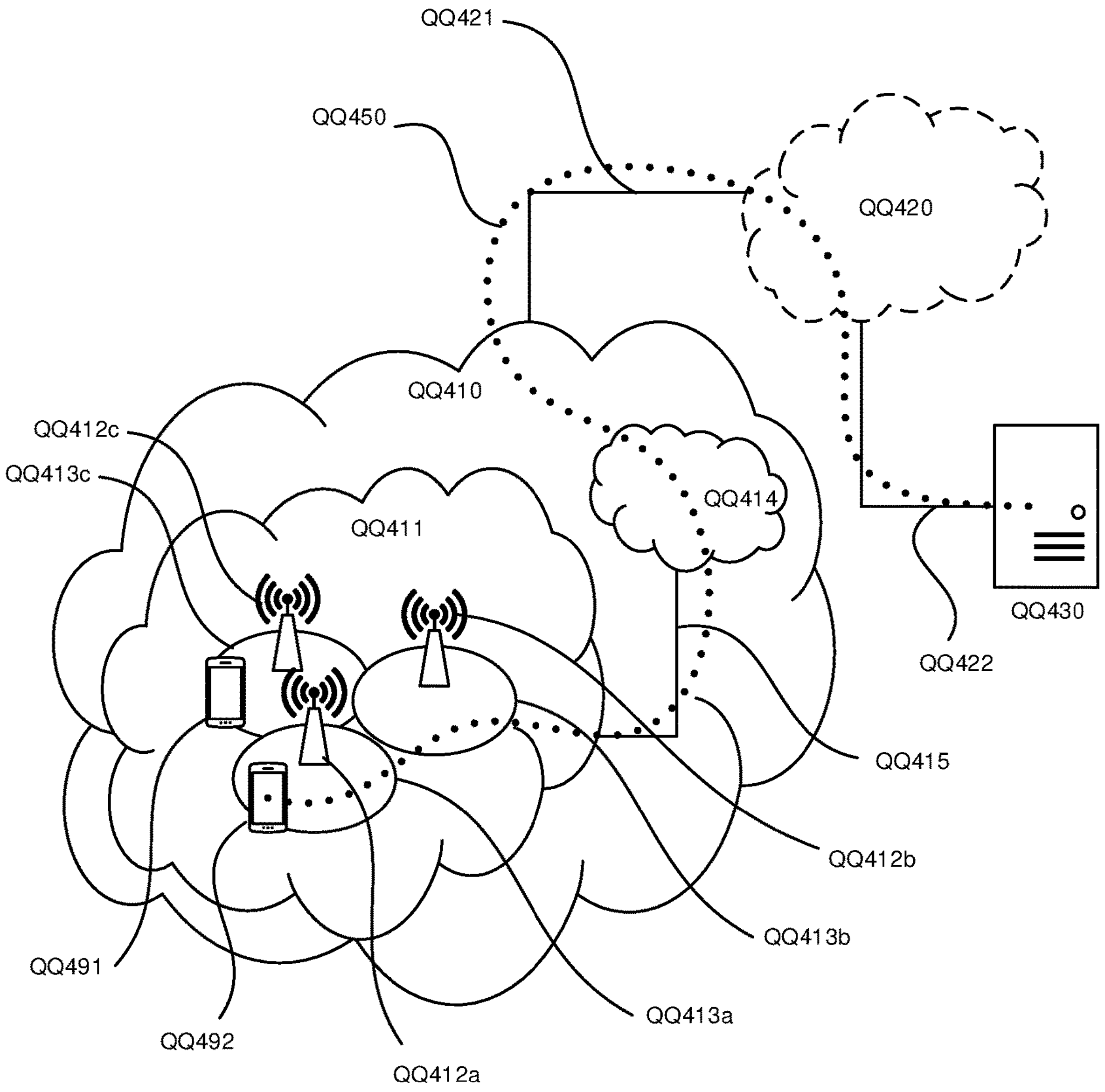
FIG. 23 shows a telecommunication network connected via an intermediate network to a host computer in accordance with some embodiments.

With reference to FIG. 23, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 23 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 24. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 24) served by base station QQ520. Communication interface QQ526 may be configured to facilitate connection QQ560 to host computer QQ510. Connection QQ560 may be direct or it may pass through a core network (not shown in FIG. 24) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 24:
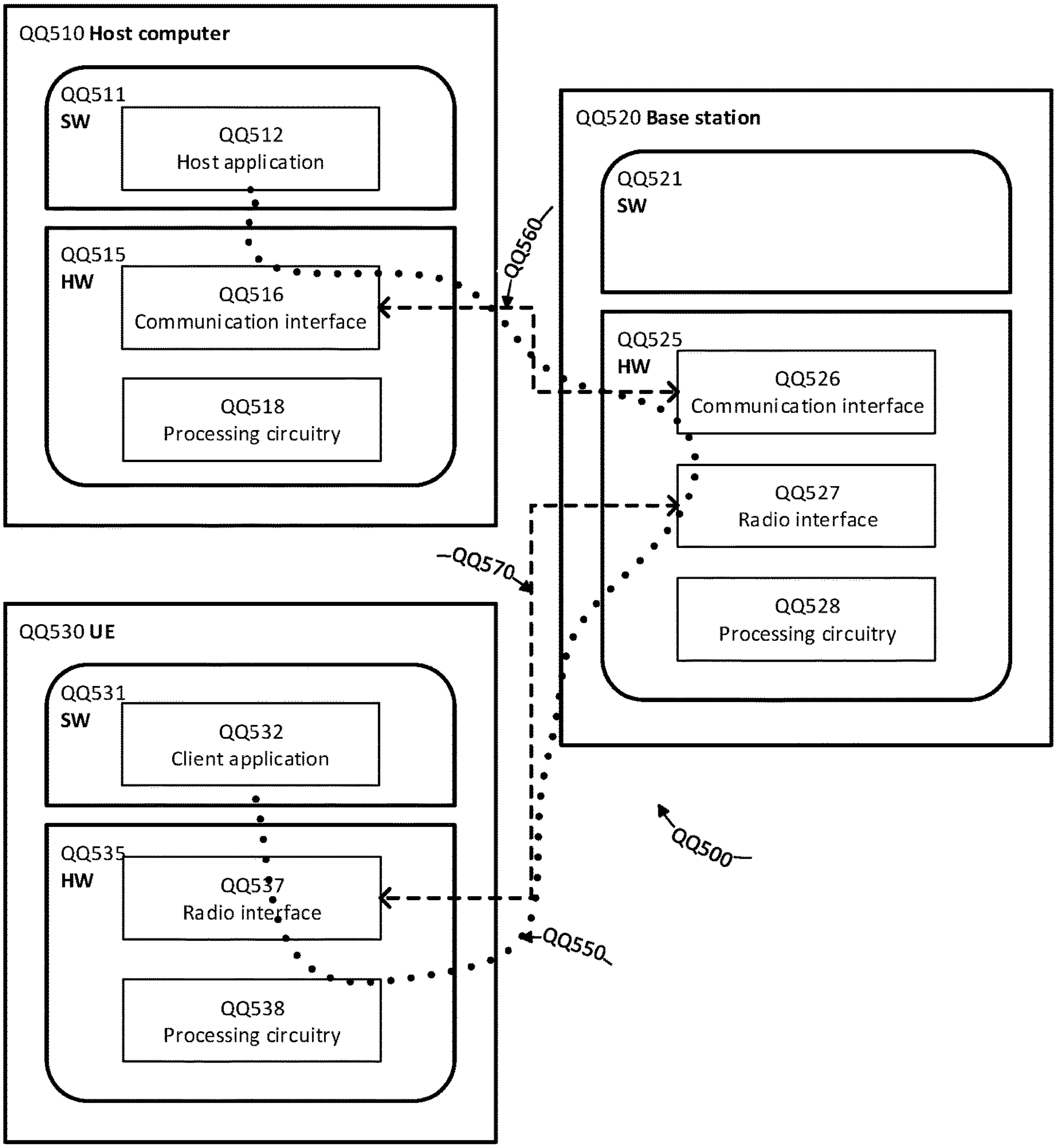
FIG. 24 shows a Host computer communicating via a base station with a user equipment over a partially wireless connection in accordance with some embodiments.

It is noted that host computer QQ510, base station QQ520 and UE QQ530 illustrated in FIG. 24 may be similar or identical to host computer QQ430, one of base stations QQ412*a*, QQ412*b*, QQ412*c* and one of UEs QQ491, QQ492 of FIG. 23, respectively. This is to say, the inner workings of these entities may be as shown in FIG. 24 and independently, the surrounding network topology may be that of FIG. 23.

In FIG. 24, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve system performance, particularly where split bearers are configured and thereby provide benefits such as increased responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 25:
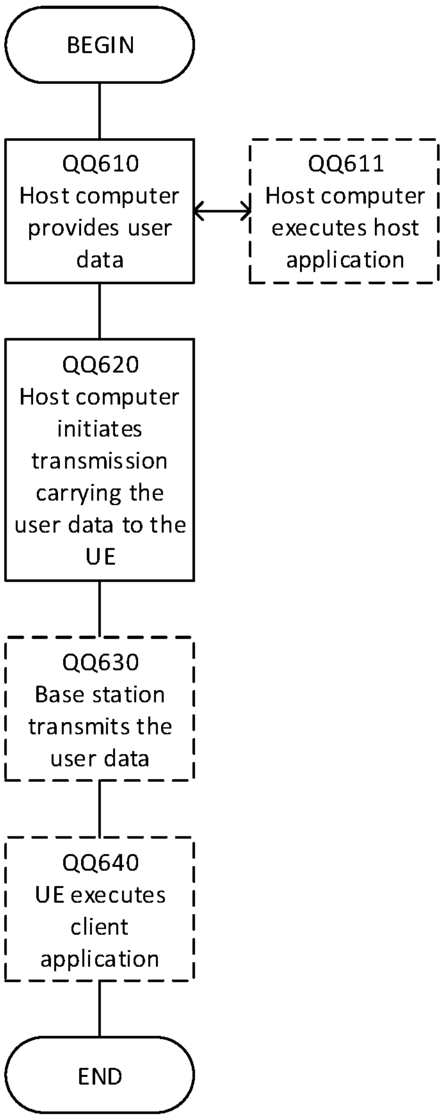
FIG. 25 shows methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 25 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 26:
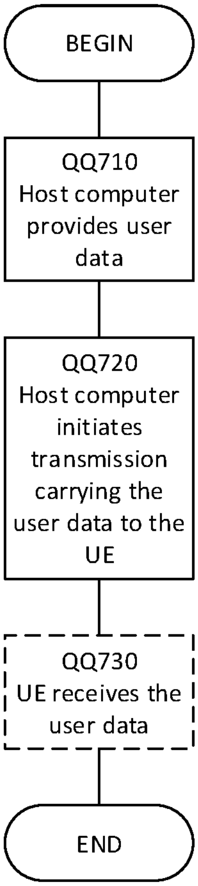
FIG. 26 shows methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 27:
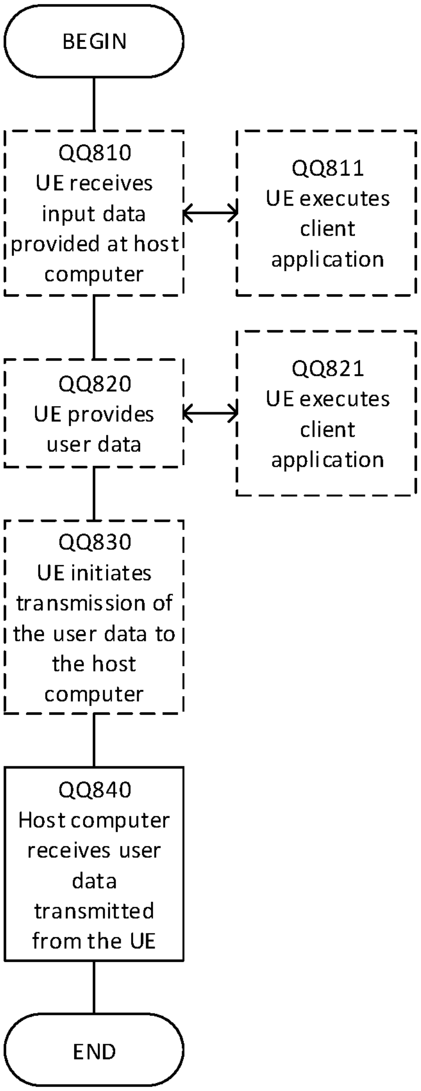
FIG. 27 shows methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 28:
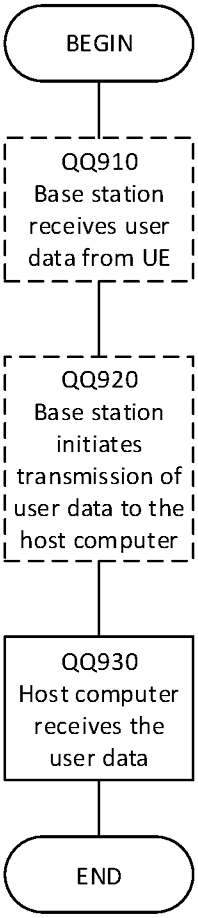
FIG. 28 shows methods implemented in a communication system including a host computer, a base station and a user equipment in accordance with some embodiments.

FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

CA Carrier Aggregation
CBR Channel Busy Ratio
DFN Direct Frame Number
DL Downlink
FDD Frequency Division Duplex
GNSS Global Navigation Satellite System
HARQ Hybrid automatic repeat request
IE Information Element
MIB Master Information Block
NSPS National Security and Public Safety
OoC Out-of-Coverage
PDCP Packet Data Convergence Protocol
RLC Radio link control
RRC Radio Resource Control
RSRP Reference Signal Received Power
RSSI Received Signal Strength Indicator
RX Receive, receiver
SFN System Frame Number
SINR Signal to interference noise ration
SL Sidelink
SLRB Sidelink Radio Bearer
SLSS Sidelink Synchronization Signals
SynchUE Synchronization UE
TDD Time Division Duplex
TETRA Terrestrial Trunked Radio
TX Transmit, transmitter
UE User Equipment
UL Uplink
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FFS For Further Study
GERAN GSM EDGE Radio Access Network
gNB Base station in NR
GSM Global System for Mobile communication
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SGW Serving Gateway
SI System Information
SIB System Information Block
SNR Signal to Noise Ratio
SON Self Optimized Network
SS Synchronization Signal
SSS Secondary Synchronization Signal
TDOA Time Difference of Arrival
TOA Time of Arrival
TSS Tertiary Synchronization Signal
TTI Transmission Time Interval
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a relay user equipment (UE) supporting device-to-device (D2D) communications, wherein the relay UE is capable of providing a connection to a communication network for a remote UE and the relay UE is configured with a primary Radio Link Control (RLC) entity and a split secondary RLC entity, the method comprising:

monitoring a data traffic volume at the relay UE; and determining a first size value and a second size value, the first size value indicating a size of a first portion of the data traffic volume, and the second size value indicating a size of a second portion of the data traffic volume, wherein the first portion of the data traffic volume relates to the relay UE, comprising Packet Data Convergence Protocol (PDCP) Protocol Data Units (PDUs) of the relay UE, and/or Radio Link Control (RLC) data of the relay UE, and the second portion of the data traffic volume relates to the remote UE that is connected to the relay UE, comprising PDCP PDU and/or RLC data of the remote UE;

determining, based at least in part on the first size value, whether to send a PDCP PDU of the relay UE to the split secondary RLC entity; and determining, based at least in part on the second size value, whether to send a PDCP PDU of the remote UE to the split secondary RLC entity, wherein determining whether to send the PDCP PDU of the relay UE to the split secondary RLC entity based at least in part on the first size value comprises:

comparing the first size value with a first threshold, or comparing a sum of the first and second size values with the first threshold.

2. The method of claim 1, wherein the relay UE determines the first size value and/or the second size value using an indication in an adaption layer of absolute or relative PDCP PDU size of each PDCP PDU carried in the same RLC SDU.

3. The method of claim 1, wherein the relay UE is configured with at least a first RLC entity, and the method further comprises:

receiving first split data for the first RLC entity from the remote UE; and forwarding the first split data to at least a first network node.

4. The method of claim 3, wherein the remote UE is connected to the first network node via the relay UE, and forwarding the first split data to the first network node comprises transmitting the first split data over a first connection between the first RLC entity and a first peer RLC entity configured in the first network node.

5. The method of claim 4, wherein the first network node is comprised in a cell group.

6. The method of claim 3, further comprising:

receiving, from the remote UE, a request message for relay discovery; and responding the remote UE with a reply message that comprises:

sidelink radio quality measurement information for a sidelink connection between the relay UE and the remote UE, cellular link radio quality measurement information for a cellular link connection between the relay UE and the first network node, and/or a UE ID of the relay UE.

7. The method of claim 6, wherein the relay UE is selected by the remote UE based on: the sidelink radio quality measurement information, the cellular link radio quality measurement information, and/or a response time of the relay UE.

8. A relay user equipment (UE) supporting device-to-device (D2D) communication, the relay UE comprising:

processing circuitry configured to cause the relay UE to perform the method of claim 1; and power supply circuitry configured to supply power to the relay UE.

9. The method of claim 1, wherein the remote UE is connected to a first network node and a second network node via the relay UE, the relay UE is configured with a first RLC entity and a second RLC entity, and the method further comprises:

receiving from the remote UE first split data for the first RLC entity;

receiving from the remote UE second split data for the second RLC entity;

transmitting the first split data over a first connection between the first RLC entity and a first peer RLC entity configured in the first network node; and transmitting the second split data over a second connection between the second RLC entity and a second peer RLC entity configured in the second network node.

* * * * *